United States Patent
Padhy et al.

(10) Patent No.: US 10,804,996 B1
(45) Date of Patent: *Oct. 13, 2020

(54) PREVENTING FREQUENT BEAM SWITCHING

(71) Applicant: QUALCOMM Incorporated, San Diego, CA (US)

(72) Inventors: Chinmaya Padhy, Koraput (IN); Kuo-Chun Lee, San Diego, CA (US); Ansah Ahmed Sheik, Hyderabad (IN); Vishnu Namboodiri Karakkad Kesavan Namboodiri, Hyderabad (IN); Theeksha Athoor Perumal, Hyderabad (IN); Rajesh Gopala Krishnan, Hyderabad (IN)

(73) Assignee: QUALCOMM Incorporated, San Diego, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/597,535

(22) Filed: Oct. 9, 2019

Related U.S. Application Data

(63) Continuation of application No. 16/363,876, filed on Mar. 25, 2019, now Pat. No. 10,447,375.

(51) Int. Cl.
*H04B 7/08* (2006.01)
*H04B 7/06* (2006.01)

(52) U.S. Cl.
CPC .......... *H04B 7/088* (2013.01); *H04B 7/0695* (2013.01)

(58) Field of Classification Search
CPC .... H04B 7/043; H04B 7/0465; H04B 7/0617; H04B 7/0639; H04B 7/0695; H04B 7/088

USPC ........ 275/259, 260, 262, 265, 267; 370/208, 370/335, 337, 342, 347; 455/444, 500, 455/502, 507, 513, 514, 67.11, 67.13, 88

See application file for complete search history.

(56) References Cited

U.S. PATENT DOCUMENTS

| | | | |
|---|---|---|---|
| 6,233,451 B1 | 5/2001 | Noerpel et al. | |
| 6,522,643 B1 | 2/2003 | Jacomb-Hood et al. | |
| 10,447,375 B1 | 10/2019 | Padhy et al. | |
| 2016/0323898 A1 | 11/2016 | Jo et al. | |
| 2017/0012692 A1 | 1/2017 | Kim et al. | |
| 2017/0214444 A1 | 7/2017 | Nigam et al. | |
| 2017/0223744 A1* | 8/2017 | Qian ..................... H04W 16/28 |

(Continued)

OTHER PUBLICATIONS

International Search Report and Written Opinion—PCT/US2019/038287—ISA/EPO—dated Nov. 21, 2019

*Primary Examiner* — Young T Tse
(74) *Attorney, Agent, or Firm* — Qualcomm IP Dept.; James Hunt Yancey, Jr.

(57) ABSTRACT

Various aspects of the present disclosure generally relate to wireless communication and techniques to prevent frequent beam switching. In some aspects, a user equipment (UE) may determine a duration of time that the UE dwells on a beam. The UE may update a data structure, stored in memory of the UE, to add or modify a stored duration value associated with the beam based at least in part on determining the duration of time that the UE dwells on the beam. The UE may determine that a condition associated with the stored duration value is satisfied. The UE may modify a priority of the beam in connection with a beam selection procedure based at least in part on determining that the condition associated with the stored duration value is satisfied. Numerous other aspects are provided.

20 Claims, 8 Drawing Sheets

(56) References Cited

U.S. PATENT DOCUMENTS

| | | |
|---|---|---|
| 2018/0152870 A1 | 5/2018 | Park |
| 2018/0206218 A1* | 7/2018 | Huang .................. H04B 7/0695 |
| 2019/0059129 A1 | 2/2019 | Luo et al. |
| 2019/0132826 A1 | 5/2019 | Xu et al. |
| 2019/0173533 A1* | 6/2019 | Kim ...................... H04W 76/27 |

* cited by examiner

PREVENTING FREQUENT BEAM SWITCHING

RELATED APPLICATION

This application is a continuation of U.S. patent application Ser. No. 16/363,876, filed Mar. 25, 2019 (now U.S. Pat. No. 10,447,375), which is hereby incorporated by reference in its entirety.

TECHNICAL FIELD

Aspects of the technology described below generally relate to wireless communication, and more particularly to techniques and apparatuses for preventing frequent beam switching. Some techniques and apparatuses described enable and provide wireless communication devices and systems configured for extended battery life and efficient use of apparatus and network resources.

INTRODUCTION

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, and/or the like). Examples of such multiple-access technologies include code division multiple access (CDMA) systems, time division multiple access (TDMA) systems, frequency-division multiple access (FDMA) systems, orthogonal frequency-division multiple access (OFDMA) systems, single-carrier frequency-division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless communication network may include a number of base stations (BSs) that can support communication for a number of user equipment (UEs). A user equipment (UE) may communicate with a base station (BS) via the downlink and uplink. The downlink (or forward link) refers to the communication link from the BS to the UE, and the uplink (or reverse link) refers to the communication link from the UE to the BS. A BS may be referred to as a Node B, a gNB, an access point (AP), a radio head, a transmit receive point (TRP), a New Radio (NR) BS, a 5G Node B, and/or the like.

Multiple access technologies have been adopted in various telecommunication standards. Wireless communication standards provide common protocols enabling different devices (e.g., user equipment) to communicate on a municipal, national, regional, and even global level. New Radio (NR), which may also be referred to as 5G, is a set of enhancements to the LTE mobile standard promulgated by the Third Generation Partnership Project (3GPP). As demand for mobile broadband access continues to increase, there exists a need for further improvements in LTE and NR technologies. These improvements can apply to other multiple access technologies and the telecommunication standards that employ these technologies.

BRIEF SUMMARY OF SOME EXAMPLES

The following summarizes some aspects of the present disclosure to provide a basic understanding of the discussed technology. This summary is not an extensive overview of all contemplated features of the disclosure, and is intended neither to identify key or critical elements of all aspects of the disclosure nor to delineate the scope of any or all aspects of the disclosure. The sole purpose of the summary is to present some concepts of one or more aspects of the disclosure in summary form as a prelude to the more detailed description that is presented later.

Advancements in wireless communication technologies have been brought about by utilizing a variety of radio frequency (RF) transmission types. One example of RF transmissions, as discussed herein, are beam transmissions. Beam transmissions can include scenarios where one or more antennas control directionality of an RF transmission. Spaced apart multiple antennas and/or antenna elements (as described below) can form beam transmissions by controlling signal transmissions (e.g., phase, magnitude, weighting, and/or the like). During beam communication scenarios, it may be desirable to switch to another beam (e.g., for better performance). Yet too frequent switching between beams for communications poses challenges and may cause undesired inefficiencies. Aspects described below enable and provide techniques for efficient RF beam communications.

In some aspects, a method of wireless communication, performed by a user equipment (UE), may include determining a duration of time that the UE dwells on a beam; updating a data structure, stored in memory of the UE, to add or modify a stored duration value associated with the beam based at least in part on determining the duration of time that the UE dwells on the beam; and modifying a priority of the beam in connection with a beam selection procedure based at least in part on determining that a condition associated with the stored duration value is satisfied.

In some aspects, a UE for wireless communication may include memory and one or more processors operatively coupled to the memory. The memory and the one or more processors may be configured to determine a duration of time that the UE dwells on a beam; update a data structure, stored in memory of the UE, to add or modify a stored duration value associated with the beam based at least in part on determining the duration of time that the UE dwells on the beam; and modify a priority of the beam in connection with a beam selection procedure based at least in part on determining that a condition associated with the stored duration value is satisfied.

In some aspects, a non-transitory computer-readable medium may store one or more instructions for wireless communication. The one or more instructions, when executed by one or more processors of a UE, may cause the one or more processors to determine a duration of time that the UE dwells on a beam; update a data structure, stored in memory of the UE, to add or modify a stored duration value associated with the beam based at least in part on determining the duration of time that the UE dwells on the beam; and modify a priority of the beam in connection with a beam selection procedure based at least in part on determining that a condition associated with the stored duration value is satisfied.

In some aspects, an apparatus for wireless communication may include means for determining a duration of time that the apparatus dwells on a beam; means for updating a data structure, stored in memory of the apparatus, to add or modify a stored duration value associated with the beam based at least in part on determining the duration of time that the apparatus dwells on the beam; and means for modifying a priority of the beam in connection with a beam selection procedure based at least in part on determining that a condition associated with the stored duration value is satisfied.

In some aspects, a method of wireless communication, performed by a UE, may include determining that a rate at which the UE switches to or from a beam satisfies a condition; and modifying, based at least in part on determining that the rate satisfies the condition, at least one of: a search and measurement periodicity associated with the beam, or a duration of a hysteresis timer associated with the beam.

In some aspects, a UE for wireless communication may include memory and one or more processors operatively coupled to the memory. The memory and the one or more processors may be configured to determine that a rate at which the UE switches to or from a beam satisfies a condition; and modify, based at least in part on determining that the rate satisfies the condition, at least one of: a search and measurement periodicity associated with the beam, or a duration of a hysteresis timer associated with the beam.

In some aspects, a non-transitory computer-readable medium may store one or more instructions for wireless communication. The one or more instructions, when executed by one or more processors of a UE, may cause the one or more processors to determine that a rate at which the UE switches to or from a beam satisfies a condition; and modify, based at least in part on determining that the rate satisfies the condition, at least one of: a search and measurement periodicity associated with the beam, or a duration of a hysteresis timer associated with the beam.

In some aspects, an apparatus for wireless communication may include means for determining that a rate at which the apparatus switches to or from a beam satisfies a condition; and means for modifying, based at least in part on determining that the rate satisfies the condition, at least one of: a search and measurement periodicity associated with the beam, or a duration of a hysteresis timer associated with the beam.

Aspects generally include a method, apparatus, system, computer program product, non-transitory computer-readable medium, user equipment, base station, wireless communication device, and/or processing system as substantially described herein with reference to and as illustrated by the accompanying drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

BRIEF DESCRIPTION OF THE DRAWINGS

So that the above-recited features of the present disclosure can be understood in detail, a more particular description is provided herein, with some aspects of the disclosure being illustrated in the appended drawings. However, the appended drawings illustrate only some aspects of this disclosure and are therefore not to be considered limiting of the scope of the disclosure. The same reference numbers in different drawings may identify the same or similar elements.

DETAILED DESCRIPTION

Figure 1:
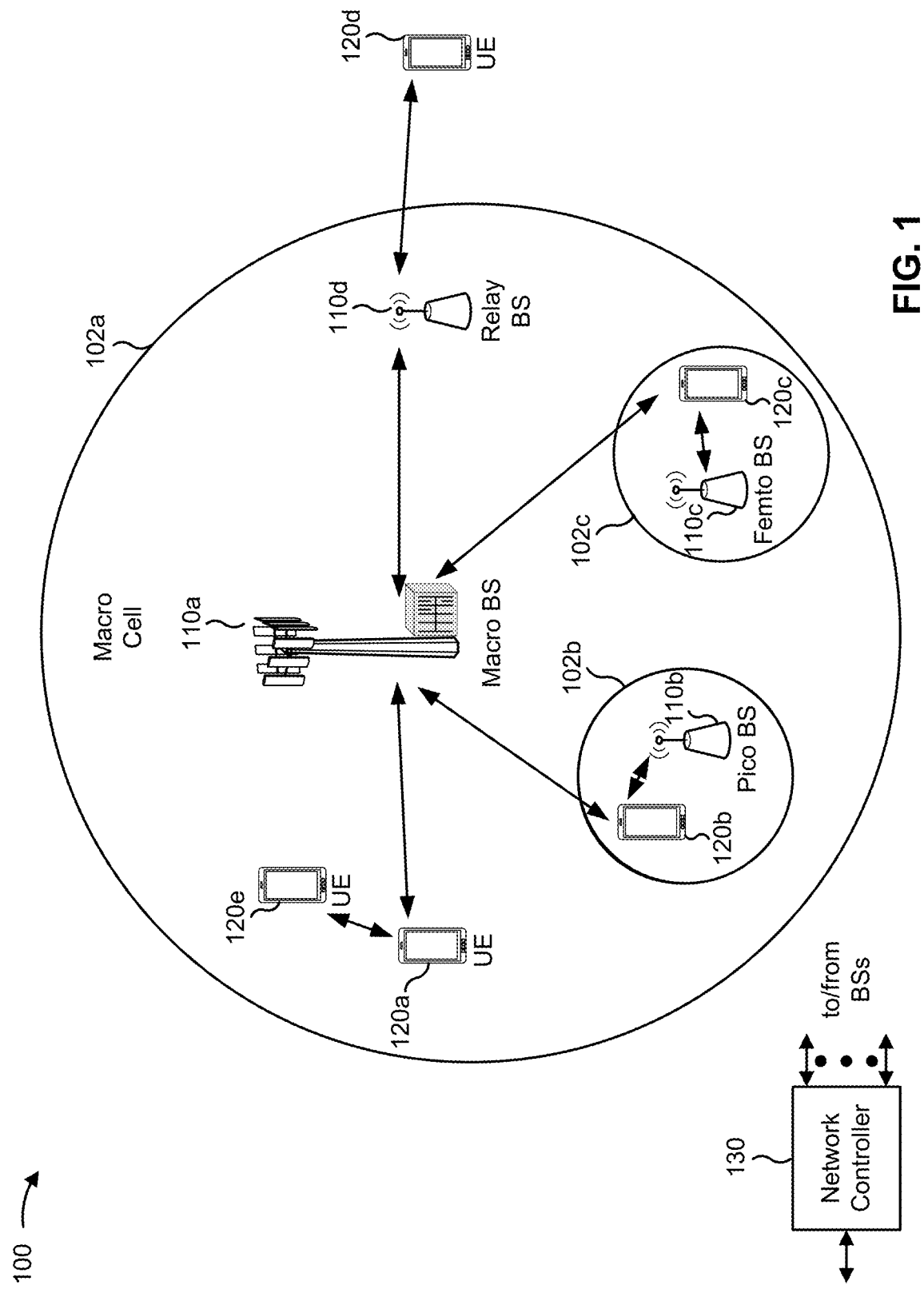
FIG. 1 is a block diagram conceptually illustrating an example of a wireless communication network, in accordance with various aspects of the present disclosure.

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, and/or the like (collectively referred to as "elements" or "features"). These elements may be implemented using hardware, software, or combinations thereof. Whether such elements are implemented as hardware or software depends upon the particular application and design constraints imposed on the overall system.

While some aspects may be described herein using terminology commonly associated with 3G and/or 4G wireless technologies, aspects of the present disclosure can be applied in other generation-based communication systems, such as 5G and later, including NR technologies.

While aspects and embodiments are described in this application by illustration to some examples, those skilled in the art will understand that additional implementations and use cases may come about in many different arrangements and scenarios. Innovations described herein may be implemented across many differing platform types, devices, systems, shapes, sizes, packaging arrangements. For example, embodiments and/or uses may come about via integrated chip embodiments and/or other non-module-component based devices (e.g., end-user devices, vehicles, communication devices, computing devices, industrial equipment, retail/purchasing devices, medical devices, AI-enabled devices, and/or the like). While some examples may or may not be specifically directed to use cases or applications, a wide assortment of applicability of described innovations may occur. Implementations may range a spectrum from chip-level or modular components to non-modular, non-chip-level implementations and further to aggregate, distributed, or OEM devices or systems incorporating one or more aspects of the described innovations. In some practical settings, devices incorporating described aspects and features may also necessarily include additional components and features for implementation and practice of claimed and described embodiments. For example, transmission and reception of wireless signals necessarily includes a number of components for analog and digital purposes (e.g., hardware components including one or more antennas, RF-chains, power amplifiers, modulators, buffers, processors, interleavers, adders/summers, and/or the like). It is intended that innovations described herein may be practiced in a wide variety of devices, chip-level components, systems, distributed arrangements, end-user devices, etc. of varying sizes, shapes, and constitution.

FIG. 1 is a diagram illustrating a wireless network 100 in which aspects of the present disclosure may be practiced. The wireless network 100 may be an LTE network or some other wireless network, such as a 5G or NR network. The wireless network 100 may include a number of BSs 110 (shown as BS 110a, BS 110b, BS 110c, and BS 110d) and other network entities. A BS is an entity that communicates with user equipment (UEs) and may also be referred to as a base station, a NR BS, a Node B, a gNB, a 5G node B (NB), an access point, a transmit receive point (TRP), and/or the like. Each BS may provide communication coverage for a particular area (e.g., a fixed or changing geographical area). In some scenarios, BSs 110 may be stationary or non-stationary. In some non-stationary scenarios, mobile BSs 110 may move with varying speeds, direction, and/or heights. In 3GPP, the term "cell" can refer to a coverage area of a BS 110 and/or a BS subsystem serving this coverage area, depending on the context in which the term is used.

A BS may provide communication coverage for a macro cell, a pico cell, a femto cell, and/or another type of cell. A macro cell may cover a relatively large geographic area (e.g., several kilometers in radius) and may allow unrestricted access by UEs with service subscription. Additionally, or alternatively, a BS may support access to an unlicensed RF band (e.g., a Wi-Fi band and/or the like). A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a closed subscriber group (CSG)). A BS for a macro cell may be referred to as a macro BS. A BS for a pico cell may be referred to as a pico BS. A BS for a femto cell may be referred to as a femto BS or a home BS. In the example shown in FIG. 1, a BS 110a may be a macro BS for a macro cell 102a, a BS 110b may be a pico BS for a pico cell 102b, and a BS 110c may be a femto BS for a femto cell 102c. A BS may support one or multiple (e.g., three) cells. The terms "eNB", "base station", "NR BS", "gNB", "TRP", "AP", "node B", "5G NB", and "cell" may be used interchangeably herein.

In some aspects, a cell may not necessarily be stationary, and the geographic area of the cell may move according to the location of a mobile BS. In some aspects, the BSs may be interconnected to one another and/or to one or more other BSs or network nodes (not shown) in the wireless network 100 through various types of backhaul interfaces such as a direct physical connection, a virtual network, and/or the like using any suitable transport network. In other scenarios, BSs may be implemented in a software defined network (SDN) manner or via network function virtualization (NFV) manner.

Wireless network 100 may also include relay stations. A relay station is an entity that can receive a transmission of data from an upstream station (e.g., a BS or a UE) and send a transmission of the data to a downstream station (e.g., a UE or a BS). A relay station may also be a UE that can relay transmissions for other UEs. In the example shown in FIG. 1, a relay station 110d may communicate with macro BS 110a and a UE 120d in order to facilitate communication between BS 110a and UE 120d. A relay station may also be referred to as a relay BS, a relay base station, a relay, and/or the like.

Wireless network 100 may be a heterogeneous network that includes BSs of different types, e.g., macro BSs, pico BSs, femto BSs, relay BSs, and/or the like. These different types of BSs may have different transmit power levels, different coverage areas, and different impacts on interference in wireless network 100. For example, macro BSs may have a high transmit power level (e.g., 5 to 40 Watts) whereas pico BSs, femto BSs, and relay BSs may have lower transmit power levels (e.g., 0.1 to 2 Watts).

A network controller 130 may couple to a set of BSs and may provide coordination and control for these BSs. Network controller 130 may communicate with the BSs via a backhaul. The BSs may also communicate with one another, e.g., directly or indirectly via a wireless or wireline backhaul.

UEs 120 (e.g., 120a, 120b, 120c) may be dispersed throughout wireless network 100, and each UE may be stationary or mobile. A UE may also be referred to as an access terminal, a terminal, a mobile station, a subscriber unit, a station, and/or the like. A UE may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device or equipment, biometric sensors/devices, wearable devices (smart watches, smart clothing, smart glasses, smart wrist bands, smart jewelry (e.g., smart ring, smart bracelet)), an entertainment device (e.g., a music or video device, or a satellite radio), a vehicular component or sensor, smart meters/sensors, industrial manufacturing equipment, robotics, drones, implantable devices, augmented reality devices, a global positioning system device, or any other suitable device that is configured to communicate via a wireless or wired medium.

Some UEs may be considered machine-type communication (MTC) or evolved or enhanced machine-type communication (eMTC) UEs. MTC and eMTC UEs include, for example, robots, drones, remote devices, sensors, meters, monitors, location tags, and/or the like, that may communicate with a base station, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, and/or may be implemented as may be implemented as NB-IoT (narrowband internet of things) devices. Some UEs may be considered a Customer Premises Equipment (CPE). UE 120 may be included inside a housing that houses components of UE 120, such as processor components, memory components, and/or the like. These components may be integrated in a variety of combinations and/or may be stand-alone, distributed components considering design constraints and/or operational preferences.

In general, any number of wireless networks may be deployed in a given geographic area. Each wireless network may support a particular RAT and may operate on one or more frequencies. A RAT may also be referred to as a radio technology, an air interface, and/or the like. A frequency may also be referred to as a carrier, a frequency channel, and/or the like. Each frequency may support a single RAT in a given geographic area in order to avoid interference between wireless networks of different RATs. In some cases, NR or 5G RAT networks may be deployed.

In some aspects, two or more UEs 120 (e.g., shown as UE 120a and UE 120e) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol, a vehicle-to-infrastructure (V2I) protocol, and/or the like), a mesh network, and/or the like. In this case, the UE 120 may perform scheduling operations, resource selection operations, and/or other operations described elsewhere herein as being performed by the base station 110. A UE performing scheduling operations can include or perform base-station-like functions in these deployment scenarios.

As indicated above, FIG. 1 is provided merely as an example. Other examples may differ from what is described with regard to FIG. 1.

Figure 2:
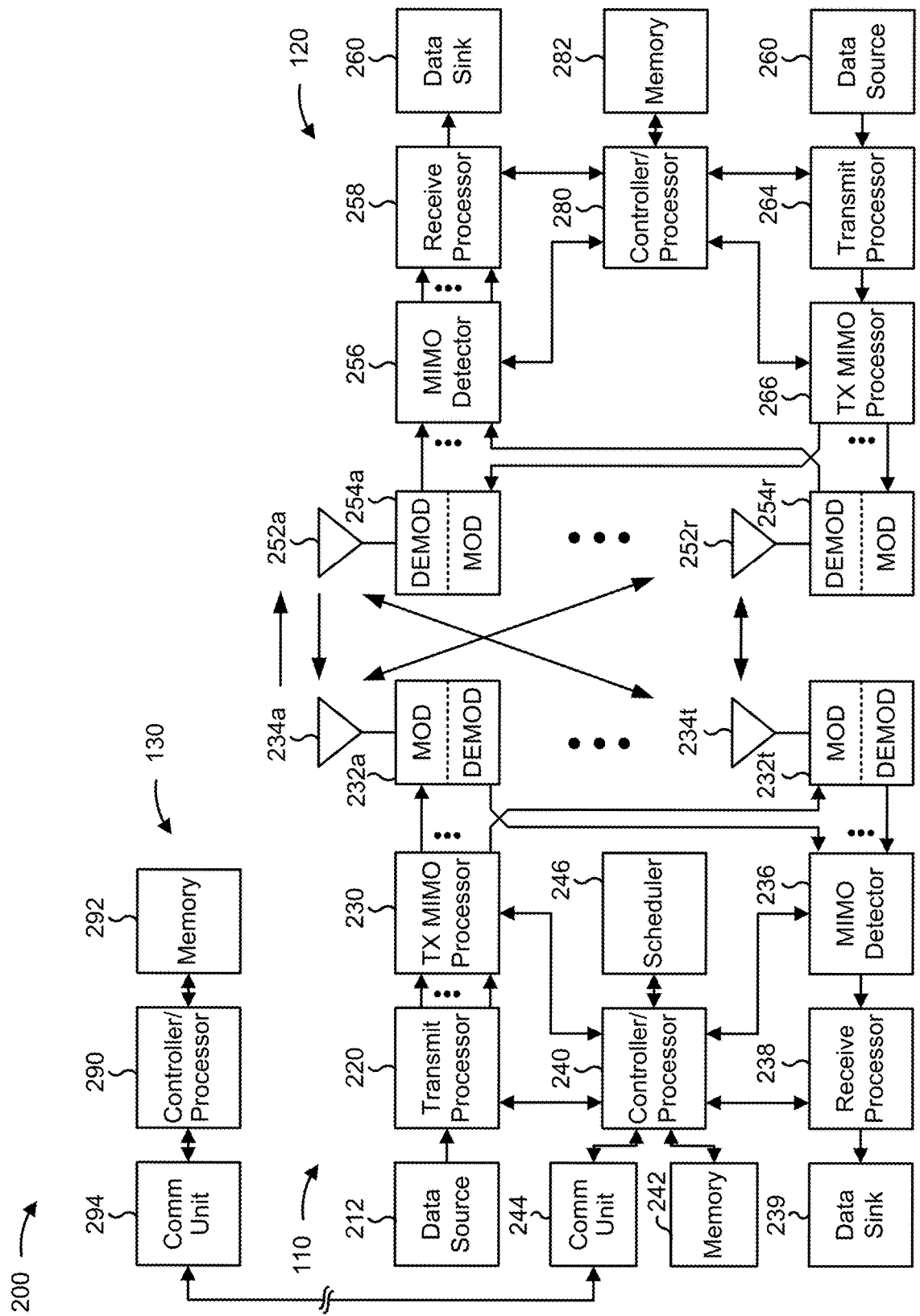
FIG. 2 is a block diagram conceptually illustrating an example of a base station in communication with a UE in a wireless communication network, in accordance with various aspects of the present disclosure.

FIG. 2 shows a block diagram of a design 200 of base station 110 and UE 120, which may be one of the base stations and one of the UEs in FIG. 1. Base station 110 may be equipped with T antennas 234a through 234t, and UE 120 may be equipped with R antennas 252a through 252r, where in general T≥1 and R≥1. The T and R antennas may be configured with multiple antenna elements formed in an array for MIMO or massive MIMO deployments that can occur in millimeter wave (mmWave or mmW) communication systems.

At base station 110, a transmit processor 220 can carry out a number of functions associated with communications. For example, transmit processor 220 may receive data from a data source 212 for one or more UEs, select one or more modulation and coding schemes (MCS) for each UE based at least in part on channel quality indicators (CQIs) received from the UE, process (e.g., encode and modulate) the data for each UE based at least in part on the MCS(s) selected for the UE, and provide data symbols for all UEs. Transmit processor 220 may also process system information (e.g., for semi-static resource partitioning information (SRPI) and/or the like) and control information (e.g., CQI requests, grants, upper layer signaling, and/or the like) and provide overhead symbols and control symbols. Transmit processor 220 may also generate reference symbols for reference signals (e.g., the cell-specific reference signal (CRS)) and synchronization signals (e.g., the primary synchronization signal (PSS) and secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide T output symbol streams to T modulators (MODs) 232a through 232t. Each modulator 232 may process a respective output symbol stream (e.g., for OFDM and/or the like) to obtain an output sample stream. Each modulator 232 may further process (e.g., convert to analog, amplify, filter, and upconvert) the output sample stream to obtain a downlink signal. T downlink signals from modulators 232a through 232t may be transmitted via T antennas 234a through 234t, respectively. According to various aspects described in more detail below, the synchronization signals can be generated with location encoding to convey additional information.

At UE 120, antennas 252a through 252r may receive downlink RF signals. The downlink signals may be from and/or transmitted by base station 110 and/or other base stations. The signals can be provided to demodulators (DEMODs) 254a through 254r, respectively. Each demodulator 254 may condition (e.g., filter, amplify, downconvert, and digitize) a received signal to obtain input samples. Each demodulator 254 may further process the input samples (e.g., for OFDM and/or the like) to obtain received symbols. A MIMO detector 256 may obtain received symbols from all R demodulators 254a through 254r, perform MIMO detection on the received symbols if applicable, and provide detected symbols. A receive processor 258 may process (e.g., demodulate and decode) the detected symbols, provide decoded data for UE 120 to a data sink 260, and provide decoded control information and system information to a controller/processor 280. A channel processor may determine reference signal received power (RSRP), received signal strength indicator (RSSI), reference signal received quality (RSRQ), channel quality indicator (CQI), and/or the like. In some aspects, one or more components of UE 120 may be included in a housing.

For uplink communications, a UE may transmit data to another device, such as a base station 110. For example, at UE 120, a transmit processor 264 may receive and process data from a data source 262 and control information (e.g., for reports comprising RSRP, RSSI, RSRQ, CQI, and/or the like) from controller/processor 280. Transmit processor 264 may also generate reference symbols for one or more reference signals. The symbols from transmit processor 264 may be precoded by a TX MIMO processor 266 if applicable, further processed by modulators 254a through 254r (e.g., for DFT-s-OFDM, CP-OFDM, and/or the like), and transmitted to base station 110. At base station 110, the uplink signals from UE 120 and other UEs may be received by antennas 234, processed by demodulators 232, detected by a MIMO detector 236 if applicable, and further processed by a receive processor 238 to obtain decoded data and control information sent by UE 120. Receive processor 238 may provide the decoded data to a data sink 239 and the decoded control information to controller/processor 240. Base station 110 may include communication unit 244 and communicate to network controller 130 via communication unit 244. Network controller 130 may include communication unit 294, controller/processor 290, and memory 292.

Controller/processor 240 of base station 110, controller/processor 280 of UE 120, and/or any other component(s) of FIG. 2 may perform one or more techniques associated with preventing frequent beam switching, as described in more detail elsewhere herein. For example, controller/processor 240 of base station 110, controller/processor 280 of UE 120, and/or any other component(s) of FIG. 2 may perform or direct operations of, for example, process 700 of FIG. 7, process 800 of FIG. 8, and/or other processes as described herein. Memories 242 and 282 may store data and program codes for base station 110 and UE 120, respectively. A scheduler 246 may schedule UEs for data transmission on the downlink and/or uplink.

In some aspects, the UE 120 may include a variety of means or components for implementing communication functions. For example, the variety of means can include means for determining a duration of time that the UE 120 dwells on a beam; means for updating a data structure, stored in memory of the UE 120, to add or modify a stored duration value associated with the beam based at least in part on determining the duration of time that the UE 120 dwells on the beam; means for modifying a priority of the beam in connection with a beam selection procedure based at least in part on determining that a condition associated with the stored duration value is satisfied; and/or the like. Additionally, or alternatively, the UE 120 may include means for determining that a rate at which the UE 120 switches to or from a beam satisfies a condition; means for modifying, based at least in part on determining that the rate satisfies the condition, at least one of: a search and measurement periodicity associated with the beam, or a duration of a hysteresis timer associated with the beam; and/or the like.

The UE 120 may also include a variety of structural components for carrying out functions of the various means. In some aspects, such means may include one or more components of UE 120 described in connection with FIG. 2, such as antenna 252, DEMOD 254, MOD 254, MIMO detector 256, receive processor 258, transmit processor 264, TX MIMO processor 266, controller/processor 280, and/or the like.

As indicated above, FIG. 2 is provided merely as an example. Other examples may differ from what is described with regard to FIG. 2.

Figure 3:
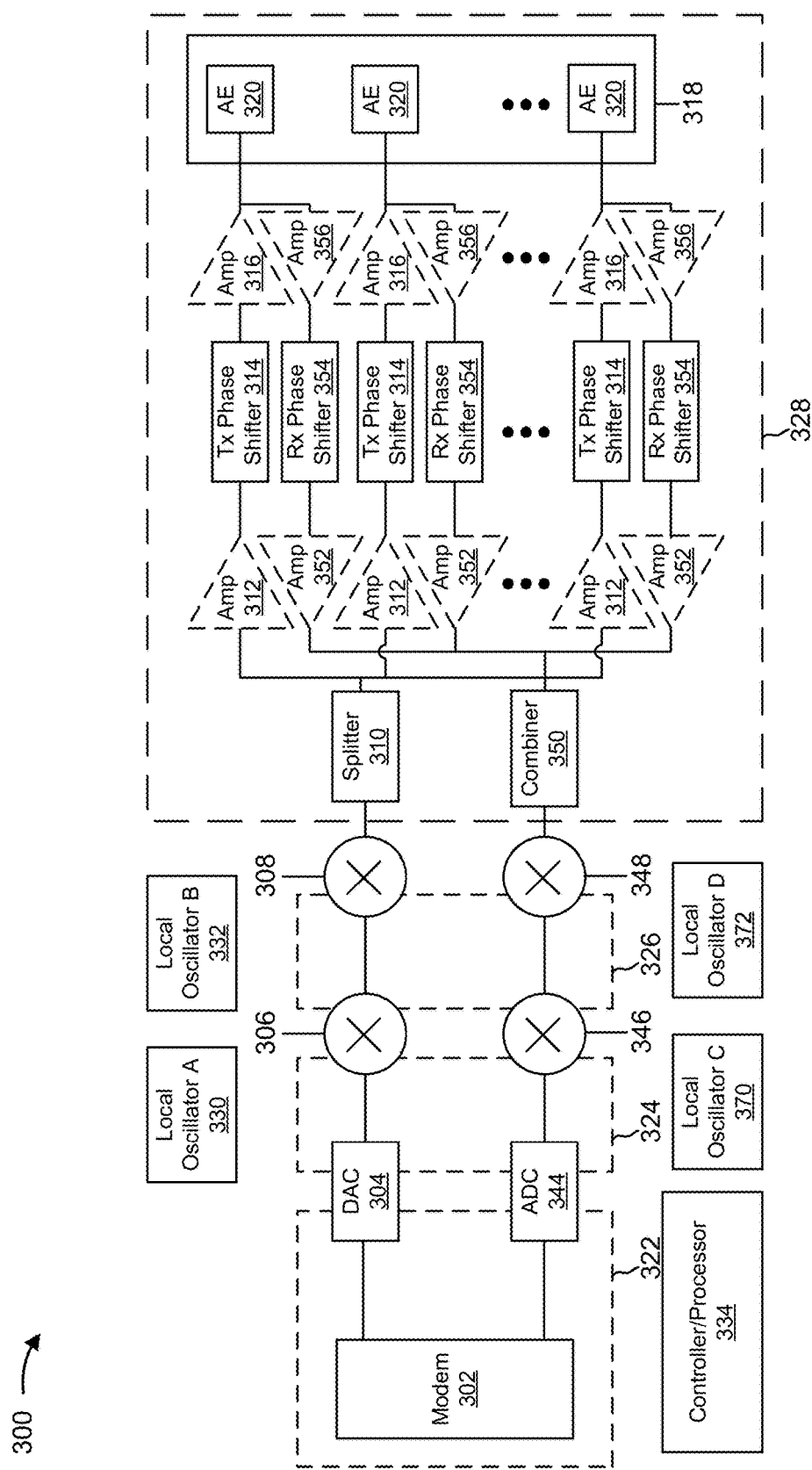
FIG. 3 illustrates an example of an architecture 300 that supports determining sub-dominant clusters in a millimeter wave (mmW) channel, in accordance with various aspects of the present disclosure.

FIG. 3 illustrates an example of an architecture 300 that supports determining sub-dominant clusters in a millimeter wave (mmW) channel, in accordance with various aspects of the present disclosure. In some examples, architecture 300 may implement aspects of wireless network 100. In some aspects, architecture 300 may be an example of a transmitting device (e.g., a first wireless device, UE, or base station) and/or a receiving device (e.g., a second wireless device, UE, or base station) as described herein.

Broadly, FIG. 3 is a diagram illustrating example hardware components of a wireless device in accordance with certain aspects of the disclosure. The illustrated components may include those that may be used for antenna element selection and/or for beamforming for transmission of wireless signals. There are numerous architectures for antenna element selection and implementing phase shifting, only one example of which is illustrated here. The architecture 300 includes a modem (modulator/demodulator) 302, a digital to analog converter (DAC) 304, a first mixer 306, a second mixer 308, and a splitter 310. The architecture 300 also includes a plurality of first amplifiers 312, a plurality of phase shifters 314, a plurality of second amplifiers 316, and an antenna array 318 that includes a plurality of antenna elements 320. Transmission lines or other waveguides, wires, traces, or the like are shown connecting the various components to illustrate how signals to be transmitted may travel between components. Boxes 322, 324, 326, and 328 indicate regions in the architecture 300 in which different types of signals travel or are processed. Specifically, box 322 indicates a region in which digital baseband signals travel or are processed, box 324 indicates a region in which analog baseband signals travel or are processed, box 326 indicates a region in which analog intermediate frequency (IF) signals travel or are processed, and box 328 indicates a region in which analog radio frequency (RF) signals travel or are processed. The architecture also includes a local oscillator A 330, a local oscillator B 332, and a controller/processor 334.

Each of the antenna elements 320 may include one or more sub-elements (not shown) for radiating or receiving RF signals. For example, a single antenna element 320 may include a first sub-element cross-polarized with a second sub-element that can be used to independently transmit cross-polarized signals. The antenna elements 320 may include patch antennas or other types of antennas arranged in a linear, two dimensional, or other pattern. A spacing between antenna elements 320 may be such that signals with a desired wavelength transmitted separately by the antenna elements 320 may interact or interfere (e.g., to form a desired beam). For example, given an expected range of wavelengths or frequencies, the spacing may provide a quarter wavelength, half wavelength, or other fraction of a wavelength of spacing between neighboring antenna elements 320 to allow for interaction or interference of signals transmitted by the separate antenna elements 320 within that expected range.

The modem 302 processes and generates digital baseband signals and may also control operation of the DAC 304, first and second mixers 306, 308, splitter 310, first amplifiers 312, phase shifters 314, and/or the second amplifiers 316 to transmit signals via one or more or all of the antenna elements 320. The modem 302 may process signals and control operation in accordance with a communication standard such as a wireless standard discussed herein. The DAC 304 may convert digital baseband signals received from the modem 302 (and that are to be transmitted) into analog baseband signals. The first mixer 306 upconverts analog baseband signals to analog IF signals within an IF using a local oscillator A 330. For example, the first mixer 306 may mix the signals with an oscillating signal generated by the local oscillator A 330 to "move" the baseband analog signals to the IF. In some cases some processing or filtering (not shown) may take place at the IF. The second mixer 308 upconverts the analog IF signals to analog RF signals using the local oscillator B 332. Similarly to the first mixer, the second mixer 308 may mix the signals with an oscillating signal generated by the local oscillator B 332 to "move" the IF analog signals to the RF, or the frequency at which signals will be transmitted or received. The modem 302 and/or the controller/processor 334 may adjust the frequency of local oscillator A 330 and/or the local oscillator B 332 so that a desired IF and/or RF frequency is produced and used to facilitate processing and transmission of a signal within a desired bandwidth.

In the illustrated architecture 300, signals upconverted by the second mixer 308 are split or duplicated into multiple signals by the splitter 310. The splitter 310 in architecture 300 splits the RF signal into a plurality of identical or nearly identical RF signals, as denoted by its presence in box 328. In other examples, the split may take place with any type of signal including with baseband digital, baseband analog, or IF analog signals. Each of these signals may correspond to an antenna element 320 and the signal travels through and is processed by amplifiers 312, 316, phase shifters 314, and/or other elements corresponding to the respective antenna element 320 to be provided to and transmitted by the corresponding antenna element 320 of the antenna array 318. In one example, the splitter 310 may be an active splitter that is connected to a power supply and provides some gain so that RF signals exiting the splitter 310 are at a power level equal to or greater than the signal entering the splitter 310. In another example, the splitter 310 is a passive splitter that is not connected to power supply and the RF signals exiting the splitter 310 may be at a power level lower than the RF signal entering the splitter 310.

After being split by the splitter 310, the resulting RF signals may enter an amplifier, such as a first amplifier 312, or a phase shifter 314 corresponding to an antenna element 320. The first and second amplifiers 312, 316 are illustrated with dashed lines because one or both of them might not be necessary in some implementations. In one implementation, both the first amplifier 312 and second amplifier 314 are present. In another, neither the first amplifier 312 nor the second amplifier 314 is present. In other implementations, one of the two amplifiers 312, 314 is present but not the other. By way of example, if the splitter 310 is an active splitter, the first amplifier 312 may not be used. By way of further example, if the phase shifter 314 is an active phase shifter that can provide a gain, the second amplifier 316 might not be used. The amplifiers 312, 316 may provide a desired level of positive or negative gain. A positive gain (positive dB) may be used to increase an amplitude of a signal for radiation by a specific antenna element 320. A negative gain (negative dB) may be used to decrease an amplitude and/or suppress radiation of the signal by a specific antenna element. Each of the amplifiers 312, 316 may be controlled independently (e.g., by the modem 302 or the controller/processor 334) to provide independent control of the gain for each antenna element 320. For example, the modem 302 and/or the controller/processor 334 may have at least one control line connected to each of the splitter 310, first amplifiers 312, phase shifters 314, and/or second amplifiers 316 which may be used to configure a gain to provide a desired amount of gain for each component and thus each antenna element 320.

The phase shifter 314 may provide a configurable phase shift or phase offset to a corresponding RF signal to be transmitted. The phase shifter 314 could be a passive phase shifter not directly connected to a power supply. Passive phase shifters might introduce some insertion loss. The second amplifier 316 could boost the signal to compensate for the insertion loss. The phase shifter 314 could be an active phase shifter connected to a power supply such that the active phase shifter provides some amount of gain or prevents insertion loss. The settings of each of the phase shifters 314 are independent meaning that each can be set to provide a desired amount of phase shift or the same amount of phase shift or some other configuration. The modem 302 and/or the controller/processor 334 may have at least one control line connected to each of the phase shifters 314 and which may be used to configure the phase shifters 314 to provide a desired amounts of phase shift or phase offset between antenna elements 320.

In the illustrated architecture 300, RF signals received by the antenna elements 320 are provided to one or more of first amplifier 356 to boost the signal strength. The first amplifier 356 may be connected to the same antenna arrays 318, e.g., for TDD operations. The first amplifier 356 may be connected to different antenna arrays 318. The boosted RF signal is input into one or more of phase shifter 354 to provide a configurable phase shift or phase offset for the corresponding received RF signal. The phase shifter 354 may be an active phase shifter or a passive phase shifter. The settings of the phase shifters 354 are independent, meaning that each can be set to provide a desired amount of phase shift or the same amount of phase shift or some other configuration. The modem 302 and/or the controller/processor 334 may have at least one control line connected to each of the phase shifters 354 and which may be used to configure the phase sifters 354 to provide a desired amount of phase shift or phase offset between antenna elements 320.

The outputs of the phase shifters 354 may be input to one or more second amplifiers 352 for signal amplification of the phase shifted received RF signals. The second amplifiers 352 may be individually configured to provide a configured amount of gain. The second amplifiers 352 may be individually configured to provide an amount of gain to ensure that the signal input to combiner 350 have the same magnitude. The amplifiers 352 and/or 356 are illustrated in dashed lines because they might not be necessary in some implementations. In one implementation, both the amplifier 352 and the amplifier 356 are present. In another, neither the amplifier 352 nor the amplifier 356 are present. In other implementations, one of the amplifiers 352, 356 is present but not the other.

In the illustrated architecture 300, signals output by the phase shifters 354 (via the amplifiers 352 when present) are combined in combiner 350. The combiner 350 in architecture combines the RF signal into a signal, as denoted by its presence in box 328. The combiner 350 may be a passive combiner, e.g., not connected to a power source, which may result in some insertion loss. The combiner 350 may be an active combiner, e.g., connected to a power source, which may result in some signal gain. When combiner 350 is an active combiner, it may provide a different (e.g., configurable) amount of gain for each input signal so that the input signals have the same magnitude when they are combined. When combiner 350 is an active combiner, it may not need the second amplifier 352 because the active combiner may provide the signal amplification.

The output of the combiner 350 is input into mixers 348 and 346. Mixers 348 and 346 generally down convert the received RF signal using inputs from local oscillators 372 and 370, respectively, to create intermediate or baseband signals that carry the encoded and modulated information. The output of the mixers 348 and 346 are input into an analog-to-digital converter (ADC) 344 for conversion to analog signals. The analog signals output from ADC 344 is input to modem 302 for baseband processing, e.g., decoding, de-interleaving, etc.

The architecture 300 is given by way of example only to illustrate an architecture for transmitting and/or receiving signals. It will be understood that the architecture 300 and/or each portion of the architecture 300 may be repeated multiple times within an architecture to accommodate or provide an arbitrary number of RF chains, antenna elements, and/or antenna panels. Furthermore, numerous alternate architectures are possible and contemplated. For example, although only a single antenna array 318 is shown, two, three, or more antenna arrays may be included each with one or more of their own corresponding amplifiers, phase shifters, splitters, mixers, DACs, ADCs, and/or modems. For example, a single UE may include two, four or more antenna arrays for transmitting or receiving signals at different physical locations on the UE or in different directions. Furthermore, mixers, splitters, amplifiers, phase shifters and other components may be located in different signal type areas (e.g., different ones of the boxes 322, 324, 326, 328) in different implemented architectures. For example, a split of the signal to be transmitted into a plurality of signals may take place at the analog RF, analog IF, analog baseband, or digital baseband frequencies in different examples. Similarly, amplification, and/or phase shifts may also take place at different frequencies. For example, in some contemplated implementations, one or more of the splitter 310, amplifiers 312, 316, or phase shifters 314 may be located between the DAC 304 and the first mixer 306 or between the first mixer 306 and the second mixer 308. In one example, the functions of one or more of the components may be combined into one component. For example, the phase shifters 314 may perform amplification to include or replace the first and/or or second amplifiers 312, 316. By way of another example, a phase shift may be implemented by the second mixer 308 to obviate the need for a separate phase shifter 314. This technique is sometimes called local oscillator (LO) phase shifting. In one implementation of this configuration, there may be a plurality of IF to RF mixers (e.g., for each antenna element chain) within the second mixer 308 and the local oscillator B 332 would supply different local oscillator signals (with different phase offsets) to each IF to RF mixer.

The modem 302 and/or the controller/processor 334 may control one or more of the other components 304-472 to select one or more antenna elements 320 and/or to form beams for transmission of one or more signals. For example, the antenna elements 320 may be individually selected or deselected for transmission of a signal (or signals) by controlling an amplitude of one or more corresponding amplifiers, such as the first amplifiers 312 and/or the second amplifiers 316. Beamforming includes generation of a beam using a plurality of signals on different antenna elements where one or more or all of the plurality signals are shifted in phase relative to each other. The formed beam may carry physical or higher layer reference signals or information. As each signal of the plurality of signals is radiated from a respective antenna element 320, the radiated signals interact, interfere (constructive and destructive interference), and amplify each other to form a resulting beam. The shape (such as the amplitude, width, and/or presence of side lobes) and the direction (such as an angle of the beam relative to a surface of the antenna array 318) can be dynamically controlled by modifying the phase shifts or phase offsets imparted by the phase shifters 314 and amplitudes imparted by the amplifiers 312, 316 of the plurality of signals relative to each other.

The controller/processor 334 may, when architecture 300 is configured as a receiving device, transmit a first beam measurement report to a first wireless device, the first beam measurement report indicating a first set of beam measurements for a wireless channel between the first wireless device and the second wireless device. The controller/processor 334 may receive from the first wireless device a cluster validity metric for at least one beam in the first beam measurement report. The controller/processor 334 may transmit to the first wireless device a second beam measurement report based at least in part on the cluster validity metric, the second beam measurement report indicating a second set of beam measurements for the wireless channel, as discussed herein. The controller/processor 334 may, when architecture 300 is configured as a transmitting device, receive a first beam measurement report from a second wireless device, the first beam measurement report indicating a first set of beam measurements for a wireless channel between the first wireless device and the second wireless device. The controller/processor 334 may transmit to the second wireless device a cluster validity metric for at least one beam in the first beam measurement report. The controller/processor 334 may receive from the second wireless device, in response to transmitting the cluster validity metric, a second beam measurement report indicating a second set of beam measurements for the wireless channel. The controller/processor 334 may select a beam for transmitting to the second wireless device based at least in part on the first and second beam measurement reports, as discussed herein. The controller/processor 334 may be located partially or fully within one or more other components of the architecture 300. For example, The controller/processor 334 may be located within the modem 302 in at least one implementation.

As indicated above, FIG. 3 is provided merely as an example. Other examples may differ from what is described with regard to FIG. 3.

Figure 4:
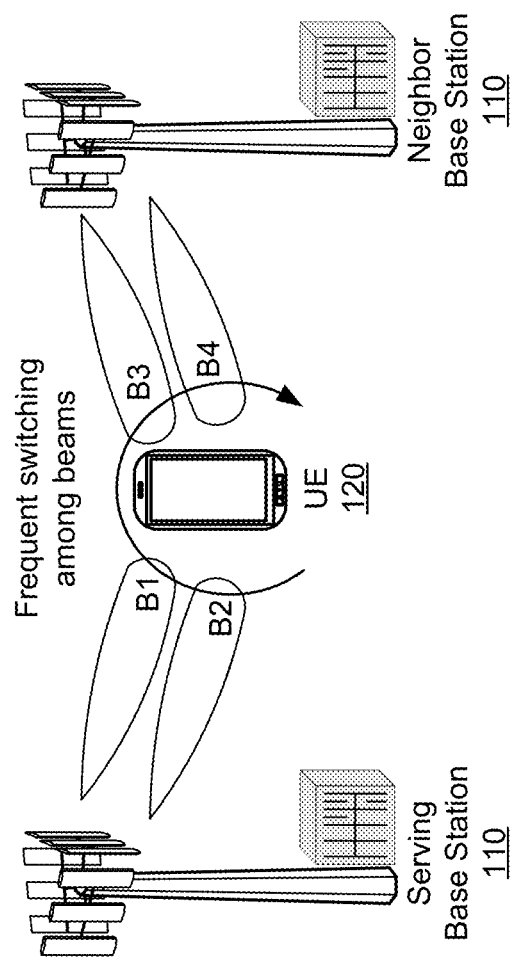
FIG. 4 is a diagram illustrating an example of frequent beam switching.

FIG. 4 is a diagram illustrating an example 400 of frequent beam switching that may occur from time to time in communication scenarios.

In some radio access technologies, such as NR or the like, beamforming may be used for directional communication between wireless nodes, such as between a base station 110 and a UE 120. A beam selection procedure may be performed to select a beam to be used for communications between the base station 110 and the UE 120. The beam selection procedure may be performed in association with initial network access. The beam selection procedure may also be utilized to perform beam switching or beam reselection from an active beam (e.g., currently being used for data communications) to a candidate beam (e.g., detecting by the UE 120 but not currently being used for data communications). For example, the UE 120 and the base station 110 may switch from using a first beam to using a second beam based at least in part on beam parameters of the first beam and/or the second beam, such as when a beam-selection criteria or a beam-switching criteria is satisfied.

As shown in FIG. 4, the UE 120 may detect multiple beams, some of which may be beams of a serving base station 110 and some of which may be beams of a neighbor base station 110. Although FIG. 4 shows the UE 120 detecting beams from both a serving base station 110 and a neighbor base station, in some cases, the UE 120 may detect beams from only a serving base station 110 and not a neighbor base station 110. Alternatively, the UE 120 may detect beams from the serving base station 110 and multiple neighbor base stations 110. In some cases, if the UE 120 exits a coverage area of the serving base station 110, the UE 120 may detect beams from only one or more neighbor base stations 110 and not the serving base station 110. In example 400, the UE 120 detects two beams (B1 and B2) from the serving base station 110 and detects two beams (B3 and B4) from the neighbor base station 110.

In some scenarios, the UE 120 may frequently switch among different beams. For example, the UE 120 may be in a mobility scenario where measured beam parameters are frequently changing, the UE 120 may be located near a cell edge and/or near the edge of service coverage provided by a beam, the UE 120 may be subject to beam fading or interference due to a location of the UE 120 and/or an environment in which the UE 120 is operating, and/or the like.

When a UE 120 detects a candidate beam with better beam parameters (e.g., that satisfy a beam switching criteria and/or a threshold) than an active beam, the UE 120 may switch to the candidate beam. For example, the UE 120 may transmit beam measurement to a base station 110, and the base station 110 may instruct the UE 120 to switch to the candidate beam. Additionally, or alternatively, the UE 120 may request a switch to the candidate beam. However, if the UE 120 remains on the candidate beam for a short period of time (e.g., less than 5 minutes, less than 1 minute, less than 30 seconds, less than 10 seconds, less than 1 second, less than 100 milliseconds, less than 10 milliseconds, and/or the like), overall performance may suffer despite the candidate beam having better beam parameters because switching between beams requires UE resources (e.g., processing power, memory, battery power, and/or the like), base station resources (e.g., processing power, memory, and/or the like), network resources (e.g., time, frequency, and/or spatial resources) for signaling information associated with beam switching, and/or the like. Furthermore, frequent switching between beams may disrupt data transmissions, thereby increasing latency and/or reducing throughput. Also, if the beam switching causes a switch from a beam of the serving base station 110 to a beam of a neighbor base station 110 (e.g., an inter-cell beam switch), then this may consume additional resources as compared to switching between beams of a serving base station 110 (e.g., an intra-cell beam switch) because the UE 120 and the base station(s) 110 will need to perform a cell reselection procedure in addition to a beam reselection procedure.

Some techniques and apparatuses described herein prevent frequent beam switching in some scenarios, thereby conserving UE resources, base station resources, and/or network resources that would otherwise be used to perform a beam reselection procedure and/or a cell reselection procedure. Furthermore, some techniques and apparatuses described herein decrease latency and/or increase throughput by maintaining data communications that would otherwise be interrupted by a beam switch. Additional details are provided below.

As indicated above, FIG. 4 is provided as an example. Other examples may differ from what is described with respect to FIG. 4.

Figure 5:
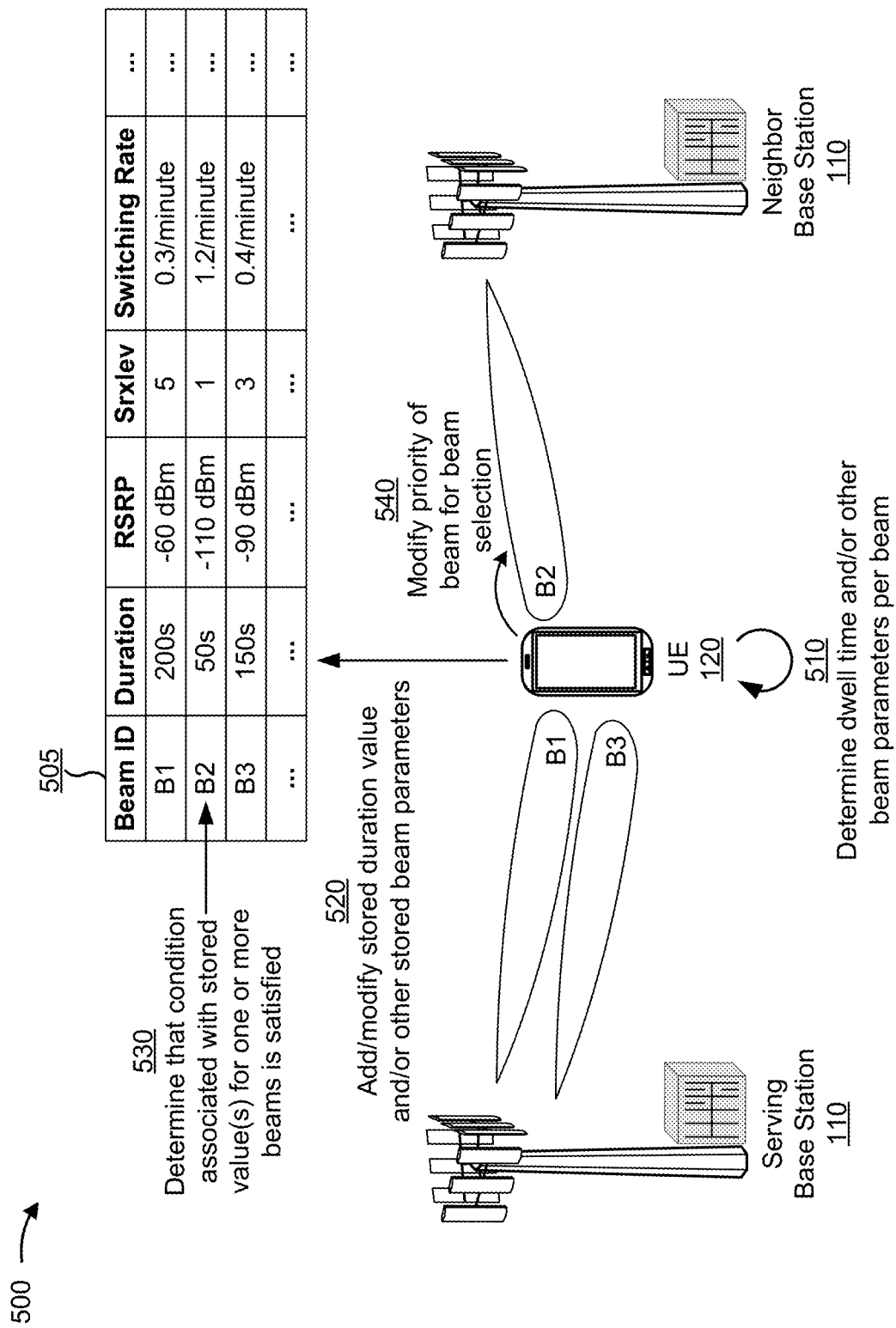
FIGS. 5-6 are diagrams illustrating examples of preventing frequent beam switching, in accordance with various aspects of the present disclosure.

FIG. 5 is a diagram illustrating an example 500 of preventing frequent beam switching, in accordance with various aspects of the present disclosure.

As shown in FIG. 5, a UE 120 may detect multiple beams. Some beams may be from a serving base station 110 and some may be beams of a neighbor base station 110. Although FIG. 5 shows the UE 120 detecting beams from both a serving base station 110 and a neighbor base station, in some cases, the UE 120 may detect beams from only a serving base station 110 and not a neighbor base station 110. Alternatively, the UE 120 may detect beams from the serving base station 110 and multiple neighbor base stations 110. In some cases, if the UE 120 exits a coverage area of the serving base station 110, the UE 120 may detect beams from only one or more neighbor base stations 110 and not the serving base station 110. In example 500, the UE 120 detects two beams (B1 and B3) from the serving base station 110 and detects one beam (B2) from the neighbor base station 110. Additionally, or alternatively, multiple beams may be detected in non-cellular communication scenarios.

As shown by reference number 510, the UE 120 may determine a dwell time for one or more beams selected by the UE 120. As an example, this can include one or more beams which the UE 120 selects and/or switches to as part of a beam selection procedure. Dwell time may refer to a time duration or a time period that a UE 120 dwells on a beam. Dwelling on a beam can include being camped on a beam, monitoring a beam, being connected to a beam, being tuned to a beam, active and/or inactive communication on the beam, and/or many other connection properties. For example, a dwell time may refer to an amount of time that elapses between a first time that the UE 120 switches to a beam and a second time that the UE 120 switches away from the beam. Dwell time can also include other timing points of interest or as desired for particular deployment scenarios.

Dwell time determinations can vary and include a variety of arrangements. In some aspects, when the UE 120 switches to a first beam, the UE 120 may store an indication of a first time at which the switch to the first beam occurs. When the UE 120 switches away from the first beam and switches to a second beam, the UE 120 may determine a second time at which the switch away from the first beam occurs. The UE 120 may determine the difference between the second time and the first time to determine the dwell time for the first beam. The UE 120 may perform similar operations to determine a dwell time for the second beam, and so on.

Additionally, or alternatively, the UE 120 may determine one or more other beam parameters for one or more beams (e.g., other than the dwell time). For example, the UE 120 may determine a beam energy parameter for a beam, a reference signal received power (RSRP) parameter for a beam, a reference signal received quality (RSRQ) parameter for a beam, a cell selection receive (Rx) level (Srxlev) parameter, a cell selection quality (Squal) parameter, a cell selection criteria parameter for a beam (e.g., an S criteria parameter, an Srxlev parameter, an Squal parameter, and/or the like), a received signal strength indicator (RSSI) parameter for a beam, a signal to interference plus noise ratio (SINR) parameter for a beam, a switching rate for a beam, and/or the like. A beam switching rate may represent a rate at which the UE 120 switches to or from the beam, such as a number of switches to or from the beam in a time period). Beam parameters can be generally specific to a beam at one or more particular time instances, yet in some deployments beam parameters may be averaged or otherwise combined (e.g., over time or over a number of instances).

Determination of beam parameters may occur in a variety of manners. For example, the UE 120 may determine one or more of these parameters based at least in part on one or more measurements of the UE 120. These measurements can occur as part of a beam selection procedure (e.g., which may result in the UE 120 switching to the beam or switching away from the beam), may occur as part of a search and measurement procedure (e.g., a periodic beam search and measurement), and/or the like. Beam parameters may also be provided by other components (e.g., a base station 110) and/or stored in a memory (e.g., from a previous time instance).

In some aspects, the UE 120 may determine and/or store a beam parameter using a single measurement for the beam parameter. The UE 120 may do this in association with a particular procedure. For example, the UE 120 may determine and/or store the beam parameter using a single measurement associated with a beam selection procedure that causes the UE 120 to switch to the beam, a single measurement associated with a beam selection procedure that causes the UE 120 to switch away from the beam, a single measurement associated with a single search and measurement occasion, and/or the like. Alternatively, the UE 120 may determine and/or store a beam parameter based at least in part on multiple measurements for the beam parameter, such as a measurement associated with a beam selection procedure that causes the UE 120 to switch to the beam, a measurement associated with a beam selection procedure that causes the UE 120 to switch away from the beam, a measurement associated with one or more search and measurement occasions, and/or the like. For example, the UE 120 may determine an average value of the beam parameter based at least in part on multiple measurements of the beam parameter (e.g., during a dwell time for the beam).

As shown by reference number 520, the UE 120 may access or modify beam-related data stored in a memory. This can include the UE 120 updating a data structure 505 (shown as a table), stored in memory of the UE 120, to add or modify one or more beam parameter values associated with a beam. A data structure may be a logical representation of stored data (as shown by the table) and generally refers to a memory location in physical memory. As shown, the data structure may store a beam identifier for a beam and information that identifies one or more beam parameters for the beam. As indicated above, a beam parameter may include a dwell time (e.g., a duration of time that the UE 120 dwells on a beam), a beam energy parameter, an RSRP parameter, an RSRQ parameter, an S criteria parameter, an Srxlev parameter, an RSSI parameter, a SINR parameter, a switching rate, and/or the like. The UE 120 may update the data structure based at least in part on determining and/or measuring the beam parameter, as described above. For example, the UE 120 may update the data structure for a beam based at least in part on switching away from the beam, at which point in time the UE 120 may determine a dwell time and/or other beam parameter(s) for the beam.

Using beam-related data in the data structure 505, a UE 120 can reduce frequent beam switching to reduce overhead signaling. Not all beams may be prevented from switching, as beam switching can be based on one or more particular beams in a set of beams. As an example, search and measurement periodicity of a particular beam can be adapted considering historical operations. If a UE 120 observes frequent change of beams, then the UE 120 can slow down the search and/or measurement period for a beam by increasing the periodicity of search and/or measurement to avoid too frequent beam reports and beam changes.

In some aspects, the UE 120 may search and/or perform a look-up in the data structure to determine whether a beam identifier for the beam is stored in the data structure and/or whether one or more beam parameter values for the beam are stored in the data structure. If the UE 120 determines that the beam identifier is not stored in the data structure, then the UE 120 may add the beam identifier to the data structure. Similarly, if the UE 120 determines that the beam identifier is not stored in the data structure or that a beam parameter value for the beam is not stored in the data structure, then the UE 120 may add a determined beam parameter value to the data structure. If the UE 120 determines that the beam identifier is stored in the data structure and that a beam parameter value for the beam is stored in the data structure, then the UE 120 may update the stored beam parameter value using the determined beam parameter value. In some aspects, the UE 120 may replace the stored beam parameter value with the determined beam parameter value.

In some aspects, the UE 120 may use the stored beam parameter value and the determined beam parameter value to calculate a new beam parameter value to be stored. For example, the UE 120 may determine an average beam parameter value based on the stored beam parameter value and the determined beam parameter value. In some aspects, the UE 120 may store multiple previously-determined beam parameter values (e.g., a threshold number of previously-determined beam parameter values), and may calculate an average beam parameter value using the multiple previously-determined beam parameter values and a newly determined beam parameter value. In some aspects, the average may be a moving average.

As shown by reference number 530, the UE 120 may determine that a condition associated with one or more stored values for one or more beam parameters is satisfied. For example, the UE 120 may determine that a condition associated with a stored duration value (corresponding to a dwell time) is satisfied. Additionally, or alternatively, the UE 120 may determine that a condition associated with one or more other beam parameters is satisfied. As described below, the condition may be a condition for a single beam or a condition for multiple beams.

In some aspects, the UE 120 may determine that the condition is satisfied based at least in part on a determination that a stored duration value (i.e., a stored dwell time value) satisfies a threshold. For example, the UE 120 may determine that the stored duration value is less than or equal to a threshold. In this case, the UE 120 dwells on the beam for a short amount of time, so switching to the beam may waste UE resources, may waste base station resources, may waste network resources, may increase latency, may reduce throughput, and/or the like, as described above. To prevent such waste, the UE 120 may deprioritize selection of the beam when this condition is satisfied, as described below. As another example, the UE 120 may determine that the stored duration value is greater than or equal to a threshold. In this case, the UE 120 dwells on the beam for a long amount of time, so the beam may be a relatively good beam (e.g., with good performance). To improve performance, the UE 120 may prioritize selection of the beam when this condition is satisfied, as described below.

In some aspects, the threshold is a fixed value (e.g., 5 minutes, 1 minute, 30 seconds, 10 seconds, 1 second, 100 milliseconds, 10 milliseconds, and/or the like). In example 500, the threshold may be a fixed value of 100 seconds. As shown, beam B2 has an average dwell time of 50 seconds, which is less than the threshold of 100 seconds. Thus, the UE 120 may deprioritize selection of beam B2, as described below. In some aspects, the threshold is a relative value with respect to one or more stored dwell times of one or more other beams. For example, the threshold may be relative value that is less than or equal to a fraction or percentage of an average of dwell times of other beams. In example 500, the threshold for a beam may be a relative value of ⅓ of the average dwell time of the other beams. In example 500, the average dwell time of beams B1 and B2 is 175 seconds, and beam B2 has an average dwell time of 50 seconds, which is less than ⅓ of the average dwell time of beams B1 and B2. Thus, the UE 120 may deprioritize selection of beam B2, as described below. In some aspects, the threshold may depend on channel conditions measured by the UE 120, a category of the UE 120, a capability of the UE 120, and/or the like. In some aspects, the threshold may be stored in memory of the UE 120 without being configured by a base station 110. In some aspects, the threshold may be indicated to the UE 120 by a base station 110, such as in a radio resource control (RRC) message or another type of signaling message.

In some aspects, the UE 120 may determine that a condition is satisfied based at least in part on multiple stored parameter values for a beam. For example, the UE 120 may determine that the condition is satisfied based at least in part on a determination that a stored dwell time value for the beam satisfies a first threshold and that a stored value for another beam parameter satisfies a threshold (e.g., that a stored RSRP value satisfies a threshold, that a stored Srxlev value satisfies a threshold, that a stored switching rate value satisfies a threshold, and/or the like).

In some aspects, the UE 120 may determine that the condition is satisfied based at least in part on determining that a first condition, associated with a first beam, is satisfied and that a second condition, associated with a second beam, is satisfied. In some aspects, the UE 120 may identify the first beam and the second beam based at least in part on a beam switching pattern, which may indicate an order in which beam switching occurs. For example, the UE 120 may determine that the UE 120 switches from the first beam (e.g., beam B2 in example 500) to the second beam (e.g., beam B3 in example 500) a threshold number of times and/or with a rate that satisfies a threshold. In this case, if the first condition and the second condition are satisfied, the UE 120 may deprioritize the first beam relative to the second beam.

For example, if the stored dwell time for the first beam (e.g., beam B2) is less than or equal to a threshold and the stored RSRP value (and/or Srxlev value, and/or the like) for the second beam (e.g., beam B3) is greater than or equal to a threshold, then the UE 120 may deprioritize the first beam relative to the second beam, as described in more detail below. Although FIG. 5 shows the first beam (B2) as being a beam of a neighbor base station 110 and the second beam (B3) as being a beam of a serving base station 110, in some aspects, the first beam and the second beam are both beams of a serving base station 110. Alternatively, in some aspects the first beam and the second beam are both beams of a neighbor base station 110. Alternatively, in some aspects the first beam is a beam of a first neighbor base station 110 and the second beam is a beam of a second neighbor base station 110.

As shown by reference number 540, the UE 120 may modify a priority of a beam (e.g., in connection with a beam selection procedure) based at least in part on determining that the condition is satisfied. In some aspects, the UE 120 may modify the priority of the beam by either prioritizing selection of the beam in connection with a beam selection procedure or deprioritizing selection of the beam in connection with a beam selection procedure. In some aspects, the UE 120 may modify the priority of the beam by removing the beam as a candidate for beam selection (e.g., to deprioritize selection of the beam), thereby preventing the beam from being selected as part of a beam selection procedure. For example, the beam may be a candidate for beam selection based at least in part on one or more beam measurements of the beam, and the UE 120 may deprioritize the beam by removing the beam as a candidate for beam selection. In some aspects, the UE 120 may remove the beam from a beam selection list that identifies candidate beams for beam selection. In some aspects, the UE 120 may deprioritize a first beam relative to a second beam by removing the first beam as a candidate for beam selection and maintaining the second beam as a candidate for beam selection. By removing a beam as a candidate for beam selection, the UE 120 may prevent frequent beam selection to the beam (e.g., when the beam is associated with a dwell time that is less than or equal to a threshold), thereby conserving UE resources, conserving base station resources, conserving network resources, reducing latency, and/or increasing throughput, as described above.

In some aspects, the UE 120 may modify the priority of the beam by adding or maintaining the beam as a candidate for beam selection (e.g., to prioritize selection of the beam), thereby permitting selection of the beam as part of a beam selection procedure. For example, the beam may be a candidate for beam selection based at least in part on one or more beam measurements of the beam, and the UE 120 may prioritize the beam by adding or maintaining the beam as a candidate for beam selection. In some aspects, the UE 120 may add the beam from a beam selection list that identifies candidate beams for beam selection (e.g., based at least in part on the measurement(s)) or may maintain the beam on the list if the beam is added to the list based at least in part on the measurement(s).

In some aspects, the UE 120 may modify the priority of the beam to deprioritize selection of the beam by decreasing a priority of the beam relative to one or more other beams that are candidates for beam selection. For example, a priority of the beam may be indicated to the UE 120 by a base station 110, and the UE 120 may deprioritize selection of the beam by modifying the priority of the beam such that the beam has a lower priority than another beam. For example, a first beam may be configured with a higher priority than a second beam, and the UE 120 may deprioritize the first beam by modifying a priority of the first beam and/or the second beam so that the first beam has a lower priority than the second beam. In some aspects, the UE 120 may modify a position of the beam in an ordered beam selection list that identifies an order of candidate beams for beam selection. By decreasing a priority of the beam, the UE 120 may reduce a likelihood of frequent beam selection to the beam (e.g., when the beam is associated with a dwell time that is less than or equal to a threshold), thereby conserving UE resources, conserving base station resources, conserving network resources, reducing latency, and/or increasing throughput, as described above.

In some aspects, the UE 120 may modify the priority of the beam to prioritize selection of the beam by increasing a priority of the beam relative to one or more other beams that are candidates for beam selection. For example, a priority of the beam may be indicated to the UE 120 by a base station 110, and the UE 120 may prioritize selection of the beam by modifying the priority of the beam such that the beam has a higher priority than another beam. For example, a first beam may be configured with a higher priority than a second beam, and the UE 120 may prioritize the second beam by modifying a priority of the first beam and/or the second beam so that the second beam has a higher priority than the first beam. In some aspects, the UE 120 may modify a position of the beam in an ordered beam selection list that identifies an order of candidate beams for beam selection. By increasing a priority of the beam, the UE 120 may increase a likelihood that the beam is selected when the beam has good performance (e.g., when the beam is associated with a dwell time that is greater than or equal to a threshold), thereby improving performance.

In some aspects, the UE 120 may modify the priority of the beam by modifying one or more beam selection criteria for the beam (and/or for other beams). For example, the UE 120 may modify a threshold that is required to be satisfied for the beam to be selected for beam selection. In some aspects, a value of the threshold may be increased to deprioritize selection of the beam. For example, the threshold may represent an amount by which a value of a beam parameter of the beam (e.g., an RSRP value, an S criteria value, an Srxlev value, and/or the like) must exceed a corresponding value of the beam parameter for another beam in order for the beam to be selected. By increasing the threshold, the UE 120 decreases the likelihood that the beam will be selected. In some aspects, a value of the threshold may be decreased to priority selection of the beam. In this way, the UE 120 may reduce a likelihood of frequent beam selection to the beam (e.g., when the beam is associated with a dwell time that is less than or equal to a threshold), thereby conserving UE resources, conserving base station resources, conserving network resources, reducing latency, and/or increasing throughput, as described above.

In some aspects, the UE 120 may deprioritize a first beam relative to a second beam by modifying one or more beam selection criteria for the first beam or the second beam in association with the beam selection procedure. For example, the UE 120 may increase a beam selection threshold for the first beam and/or may decrease a beam selection threshold for the second beam. In this way, the UE 120 may reduce a likelihood of frequent beam selection to the first beam while selecting the second beam (e.g., which satisfies a condition), thereby conserving UE resources, conserving base station resources, conserving network resources, reducing latency, and/or increasing throughput, as described above. Additionally, or alternatively, the UE 120 may deprioritize a first beam relative to a second beam by selecting the second beam instead of the first beam during a beam selection procedure.

In some aspects, the UE 120 may modify a priority of a beam by modifying a search and measurement periodicity associated with the beam. For example, the UE 120 may increase a search and measurement periodicity for a beam to deprioritize selection of the beam, thereby causing a search and measurement procedure for the beam to be performed less often. In this way, the likelihood of switching to the beam is decreased, thereby conserving UE resources, conserving base station resources, conserving network resources, reducing latency, and/or increasing throughput, as described above. As another example, the UE 120 may decrease a search and measurement periodicity for a beam to prioritize selection of the beam, thereby causing a search and measurement procedure for the beam to be performed more often. If the beam has good performance as indicated by one or more stored values (e.g., a dwell time and/or one or more other beam parameters), then this may improve performance by increasing the likelihood that a beam with good performance is selected.

In some aspects, the UE 120 may modify a priority of a beam by modifying a hysteresis timer associated with the beam. The UE 120 may use a hysteresis timer for a beam to prevent switching back to the beam for a period of time after switching away from the beam. For example, the UE 120 may start the hysteresis timer after switching away from the beam, and may refrain from switching back to the beam until after the hysteresis timer expires. In some aspects, the UE 120 may increase a duration of the hysteresis timer to deprioritize selection of the beam. In this way, the UE 120 may increase an amount of time that must elapse before switching back to the beam, thereby decreasing a likelihood that the beam is selected and consequently conserving UE resources, conserving base station resources, conserving network resources, reducing latency, and/or increasing throughput, as described above. As another example, the UE 120 may decrease a duration of the hysteresis timer to prioritize selection of the beam. If the beam has good performance as indicated by one or more stored values (e.g., a dwell time and/or one or more other beam parameters), then this may decrease an amount of time that must elapse before switching back to the beam, thereby increasing a likelihood that the beam with good performance is selected.

In some aspects, the UE 120 may employ multiple techniques described above to modify a priority of a beam. For example, to deprioritize selection of a beam, the UE 120 may decrease a priority of the beam relative to one or more other beams that are candidates for beam selection in association with the beam selection procedure, may modify one or more beam selection criteria for the beam in association with the beam selection procedure, may modify a search and measurement periodicity associated with the beam, may modify a hysteresis timer associated with the beam, and/or the like.

As indicated above, FIG. 5 is provided as an example. Other examples may differ from what is described with respect to FIG. 5.

Figure 6:
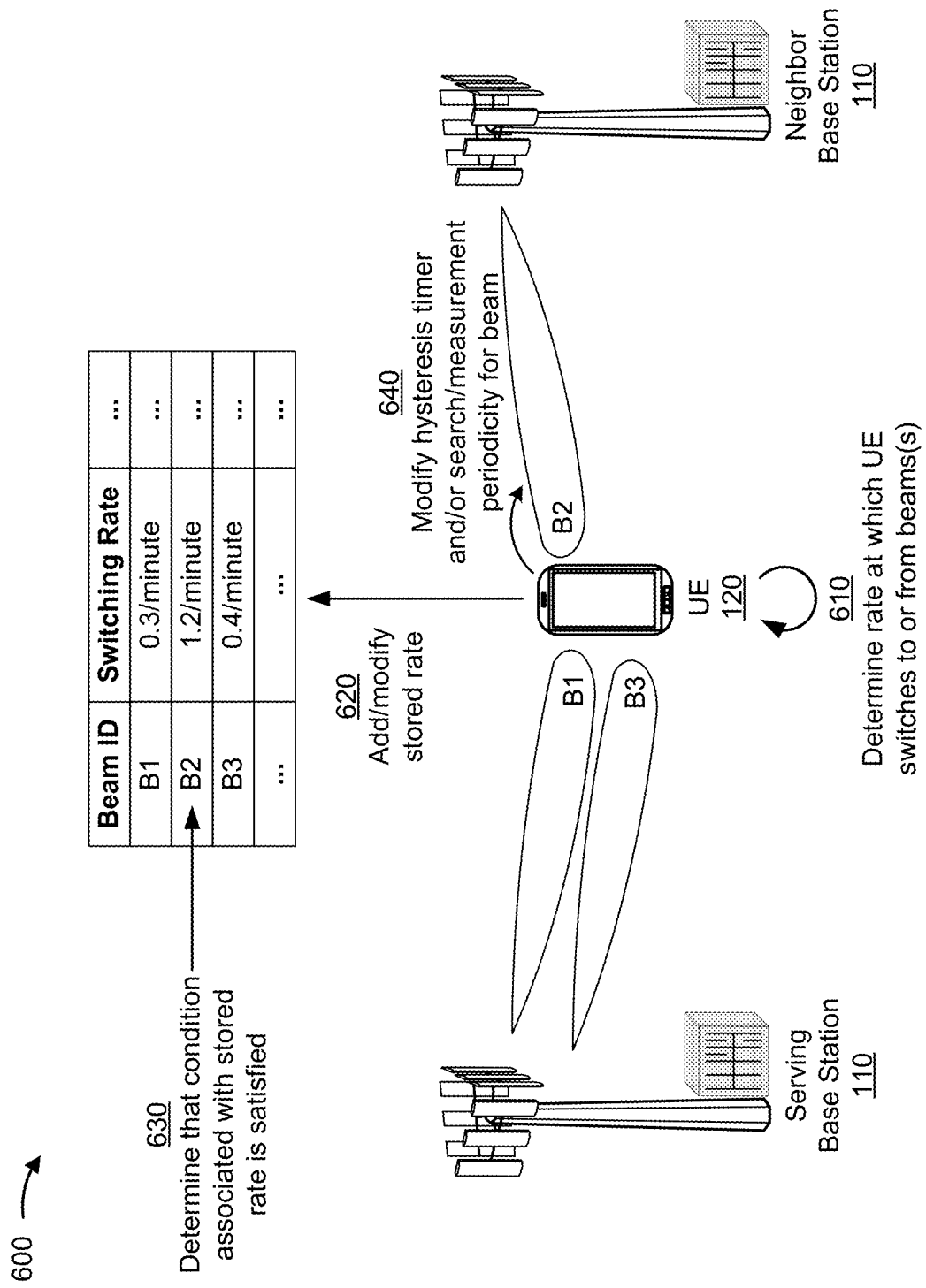

FIG. 6 is a diagram illustrating an example 600 of preventing frequent beam switching, in accordance with various aspects of the present disclosure.

As shown in FIG. 6, a UE 120 may detect multiple beams, some of which may be beams of a serving base station 110 and some of which may be beams of a neighbor base station 110. Although FIG. 6 shows the UE 120 detecting beams from both a serving base station 110 and a neighbor base station, the UE 120 may detect beams from only a serving base station 110, from multiple neighbor base stations 110, from only one or more neighbor base stations 110, and/or the like, as described above in connection with FIG. 5. In example 600, the UE 120 detects two beams (B1 and B3) from the serving base station 110 and detects one beam (B2) from the neighbor base station 110.

As shown by reference number 610, the UE 120 may determine a rate at which the UE switches to or from a beam, sometimes referred to as a switching rate. The switching rate may indicate a measured or observed number of switches per time period, such as a number of switches per minute, a number of switches per 5 minutes, a number of switches per 10 minutes, a number of switches per hour, a number of switches per day, and/or the like. For example, the UE 120 may increment the number of switches when the UE 120 switches to the beam, switches away from the beam, or both.

As shown by reference number 620, the UE 120 may update a data structure (shown as a table), stored in memory of the UE 120, to add or modify a stored switching rate value associated with the beam. As shown, the data structure may store a beam identifier for a beam and information that identifies a switching rate for the beam. In some aspects, the UE 120 may update the data structure for a beam based at least in part on switching to the beam or switching away from the beam. Additionally, or alternatively, the UE 120 may update the data structure for one or more other beam parameter values (e.g., other than a switching rate) associated with a beam. A beam parameter may include one or more beam parameters described above in connection with FIG. 5. The UE 120 may update the data structure by adding or updating a stored value for a beam, as described above in connection with FIG. 5.

As shown by reference number 630, the UE 120 may determine that a condition associated with the stored switching rate value is satisfied. Additionally, or alternatively, the UE 120 may determine that a condition associated with one or more other stored beam parameter values satisfies a threshold. The condition may be a condition for a single beam parameter (e.g., the switching rate) or a condition for multiple beam parameters. For example, the UE 120 may determine that the rate at which the UE switches to or from a beam is greater than or equal to a threshold.

The threshold may be a fixed value or a relative value, as described above in connection with FIG. 5. As further described above in connection with FIG. 5, the threshold may be stored in memory of the UE 120 without being configured by a base station 110 or may be indicated to the UE 120 by a base station 110, such as in an RRC message or another type of signaling message.

As shown by reference number 640, based at least in part on determining that the switching rate and/or one or more other beam parameters satisfies the condition, the UE 120 may modify a duration of a hysteresis timer associated with the beam and/or a search and measurement periodicity associated with the beam. For example, the UE 120 may increase a duration of the hysteresis timer, as described above in connection with FIG. 5. In some aspects, the UE 120 may use different hysteresis timer durations for different beams. For example, the UE 120 may use a beam-specific hysteresis timer duration or a beam group-specific hysteresis timer duration. In this case, the UE 120 may modify a hysteresis timer duration for one or more beams for which the condition is satisfied, and may maintain (e.g., refrain from modifying) a hysteresis timer duration for one or more beams for which the condition is not satisfied.

Additionally, or alternatively, the UE 120 may increase a search and measurement periodicity for the beam, thereby causing a search and measurement procedure for the beam to be performed less frequently. In this way, the likelihood of switching to the beam is decreased, thereby conserving UE resources, conserving base station resources, conserving network resources, reducing latency, and/or increasing throughput, as described above. In some aspects, the UE 120 may use different search and measurement periodicities for different beams. For example, the UE 120 may use a beam-specific search and measurement periodicity or a beam group-specific search and measurement periodicity. In this case, the UE 120 may modify a search and measurement periodicity for one or more beams for which the condition is satisfied, and may maintain (e.g., refrain from modifying) a search and measurement periodicity for one or more beams for which the condition is not satisfied.

In some aspects, the UE 120 may perform one or more operations described above in connection with FIG. 5 based at least in part on determining that the switching rate for a beam satisfies a condition. For example, based at least in part on determining that the switching rate for a beam satisfies a condition, the UE 120 may determine a duration of time that the UE 120 dwells on the beam and/or may determine one or more other beam parameters associated with the beam. The UE 120 may then update a data structure to add or modify a stored beam parameter value associated with the beam, may determine that a condition associated with the stored beam parameter value is satisfied, and may deprioritize selection of the beam based at least in part on determining that the condition associated with the stored beam parameter value is satisfied. Thus, the determination that the switching rate for a beam satisfies a condition may be a trigger for measuring one or more other beam parameters of the beam, for storing beam parameter values based at least in part on the measurements, for determining whether a condition associated with a stored beam parameter value is satisfied, for deprioritizing selection of the beam, and/or the like.

In this way, the UE 120 may prevent switching to a beam and/or may reduce a likelihood of switching to a beam when such a switch is likely to waste resources, such as when the beam is associated with a high switching rate, a low dwell time, or one or more other beam parameters that indicate, e.g., poor performance of the beam. This may conserve UE resources, conserve base station resources, conserve network resources, reduce latency, increase throughput, increase reliability, and/or the like.

As indicated above, FIG. 6 is provided as an example. Other examples may differ from what is described with respect to FIG. 6.

Figure 7:
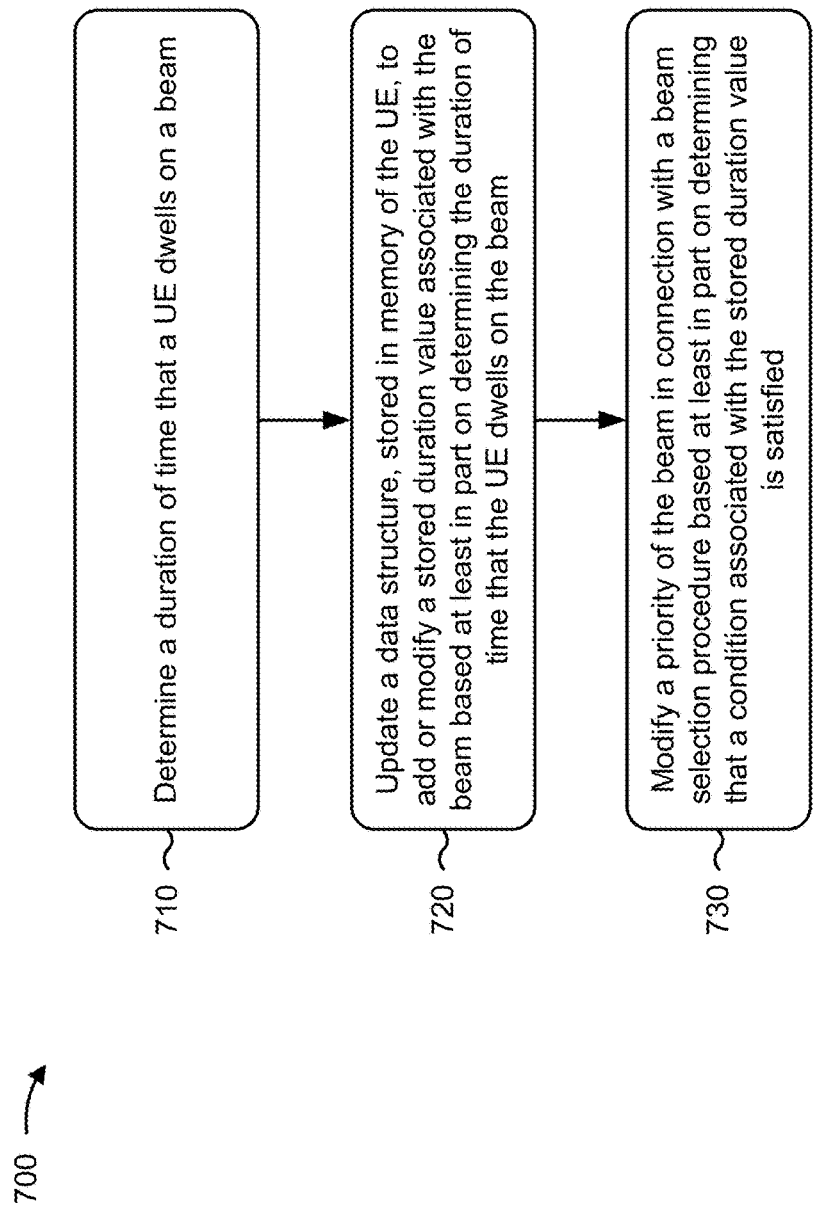
FIGS. 7-8 are diagrams illustrating example processes relating to preventing frequent beam switching, in accordance with various aspects of the present disclosure.

FIG. 7 is a diagram illustrating an example process 700 performed, for example, by a UE, in accordance with various aspects of the present disclosure. Example process 700 is an example where a UE (e.g., UE 120 and/or the like) performs operations associated with preventing frequent beam switching.

As shown in FIG. 7, in some aspects, process 700 may include determining a duration of time that the UE dwells on a beam (block 710). For example, the UE (e.g., using controller/processor 280, memory 282, and/or the like) may determine a duration of time that the UE dwells on a beam, as described above.

As further shown in FIG. 7, in some aspects, process 700 may include updating a data structure, stored in memory of the UE, to add or modify a stored duration value associated with the beam based at least in part on determining the duration of time that the UE dwells on the beam (block 720). For example, the UE (e.g., using controller/processor 280, memory 282, and/or the like) may update a data structure to add or modify a stored duration value associated with the beam based at least in part on determining the duration of time that the UE dwells on the beam, as described above. In some aspects, the data structure is stored in memory of the UE.

As further shown in FIG. 7, in some aspects, process 700 may include modifying a priority of the beam in connection with a beam selection procedure based at least in part on determining that the condition associated with the stored duration value is satisfied (block 730). For example, the UE (e.g., using controller/processor 280, memory 282, and/or the like) may modify a priority of the beam in connection with a beam selection procedure based at least in part on determining that a condition associated with the stored duration value is satisfied, as described above.

Process 700 may include additional aspects, such as any single implementation or any combination of aspects described below and/or in connection with one or more other processes described elsewhere herein.

In a first aspect, modifying the priority of the beam comprises at least one of: removing the beam as a candidate for beam selection in association with the beam selection procedure, adding or maintaining the beam as a candidate for beam selection in association with the beam selection procedure, decreasing a priority of the beam relative to one or more other beams that are candidates for beam selection in association with the beam selection procedure, increasing a priority of the beam relative to one or more other beams that are candidates for beam selection in association with the beam selection procedure, modifying one or more beam selection criteria for the beam in association with the beam selection procedure, or a combination thereof.

In a second aspect alone or in combination with the first aspect, determining that the condition associated with the stored duration value is satisfied comprises determining that the stored duration value satisfies a threshold.

In a third aspect alone or in combination with one or more of the first through second aspects, the duration of time that the UE dwells on the beam represents an amount of time between switching to the beam and switching away from the beam.

In a fourth aspect alone or in combination with one or more of the first through third aspects, the stored duration value represents an average duration of time that the UE dwells on the beam after switching to the beam.

In a fifth aspect alone or in combination with one or more of the first through fourth aspects, process 700 includes determining a set of beam parameters for a corresponding set of beams, wherein the set of beam parameters includes one or more beam parameters for each beam of the set of beams; and updating the data structure to add or modify a set of stored beam parameters for the corresponding set of beams based at least in part on determining the set of beam parameters.

In a sixth aspect alone or in combination with one or more of the first through fifth aspects, determining that the condition is satisfied comprises determining that a condition associated with the stored duration value and one or more stored beam parameters, of the set of stored beam parameters, is satisfied.

In a seventh aspect alone or in combination with one or more of the first through sixth aspects, the one or more beam parameters includes at least one of: a beam energy parameter, a reference signal received power parameter, an Srxlev parameter, an S criteria parameter, a reference signal received quality parameter, a received signal strength indicator parameter, a signal to interference plus noise ratio parameter, or a combination thereof.

In an eighth aspect alone or in combination with one or more of the first through seventh aspects, the beam is a first beam and the condition is a first condition; and process 700 includes: determining a stored beam parameter associated with a second beam; determining that a second condition associated with the stored beam parameter is satisfied; and deprioritizing selection of the first beam, relative to the second beam, in connection with the beam selection procedure based at least in part on determining that the first condition and the second condition are satisfied.

In a ninth aspect alone or in combination with one or more of the first through eighth aspects, deprioritizing selection of the first beam relative to the second beam comprises at least one of: selecting the second beam instead of the first beam in connection with the beam selection procedure, removing the first beam as a candidate for beam selection and maintaining the second beam as a candidate for beam selection in association with the beam selection procedure, decreasing a priority of the second beam relative to the first beam in a beam selection list associated with the beam selection procedure, modifying one or more beam selection criteria for the first beam or the second beam in association with the beam selection procedure, or a combination thereof.

In a tenth aspect alone or in combination with one or more of the first through ninth aspects, the first beam is a neighbor cell beam and the second beam is a serving cell beam.

In an eleventh aspect alone or in combination with one or more of the first through tenth aspects, determining that the condition associated with the stored duration value is satisfied further comprises determining that a rate at which the UE switches to or from the beam satisfies a condition.

In a twelfth aspect alone or in combination with one or more of the first through eleventh aspects, modifying the priority of the beam comprises at least one of: modifying a search and measurement periodicity associated with the beam, modifying a hysteresis timer associated with the beam, or a combination thereof.

Although FIG. 7 shows example blocks of process 700, in some aspects, process 700 may include additional blocks, fewer blocks, different blocks, or differently arranged blocks than those depicted in FIG. 7. Additionally, or alternatively, two or more of the blocks of process 700 may be performed in parallel.

Figure 8:
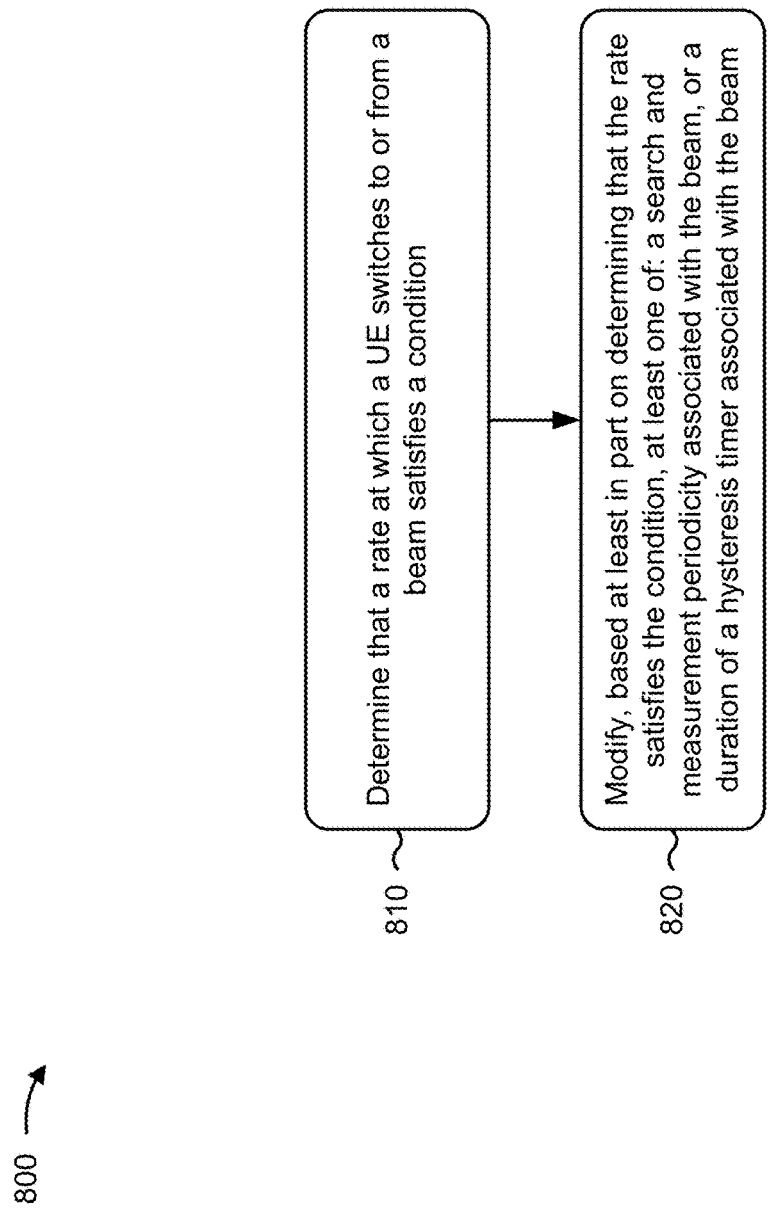

FIG. 8 is a diagram illustrating an example process 800 performed, for example, by a UE, in accordance with various aspects of the present disclosure. Example process 800 is an example where a UE (e.g., UE 120 and/or the like) performs operations associated with preventing frequent beam switching.

As shown in FIG. 8, in some aspects, process 800 may include determining that a rate at which the UE switches to or from a beam satisfies a condition (block 810). For example, the UE (e.g., using controller/processor 280, memory 282, and/or the like) may determine that a rate at which the UE switches to or from a beam satisfies a condition, as described above.

As further shown in FIG. 8, in some aspects, process 800 may include modifying, based at least in part on determining that the rate satisfies the condition, at least one of a search and measurement periodicity associated with the beam or a duration of a hysteresis timer associated with the beam (block 820). For example, the UE (e.g., using controller/processor 280, memory 282, and/or the like) may modify, based at least in part on determining that the rate satisfies the condition, at least one of a search and measurement periodicity associated with the beam or a duration of a hysteresis timer associated with the beam, as described above.

Process 800 may include additional aspects, such as any single implementation or any combination of aspects described below and/or in connection with one or more other processes described elsewhere herein.

In a first aspect, determining that the rate at which the UE switches to or from the beam satisfies a condition comprises determining that the rate is greater than or equal to a threshold.

In a second aspect alone or in combination with the first aspect, modifying the search and measurement periodicity comprises increasing the search and measurement periodicity to perform search and measurement less frequently for the beam.

In a third aspect alone or in combination with one or more of the first through second aspects, modifying the duration of the hysteresis timer comprises increasing the duration of the hysteresis timer, wherein beam selection to the beam is to be prevented prior to expiration of the hysteresis timer.

In a fourth aspect alone or in combination with one or more of the first through third aspects, the search and measurement periodicity is modified for the beam and another search and measurement periodicity is maintained for one or more other beams.

In a fifth aspect alone or in combination with one or more of the first through fourth aspects, the duration of the hysteresis timer is modified for the beam and a duration of another hysteresis timer is maintained for one or more other beams.

In a sixth aspect alone or in combination with one or more of the first through fifth aspects, process 800 includes determining a duration of time that the UE dwells on the beam based at least in part on determining that the rate at which the UE switches to or from the beam satisfies a condition; updating a data structure, stored in memory of the UE, to add or modify a stored duration value associated with the beam based at least in part on determining the duration of time that the UE dwells on the beam; determining that a condition associated with the stored duration value is satisfied; and deprioritizing selection of the beam in connection with a beam selection procedure based at least in part on determining that the condition associated with the stored duration value is satisfied.

Although FIG. 8 shows example blocks of process 800, in some aspects, process 800 may include additional blocks, fewer blocks, different blocks, or differently arranged blocks than those depicted in FIG. 8. Additionally, or alternatively, two or more of the blocks of process 800 may be performed in parallel.

The foregoing disclosure provides illustration and description, but is not intended to be exhaustive or to limit the aspects to the precise form disclosed. Modifications and variations may be made in light of the above disclosure or may be acquired from practice of the aspects.

As used herein, the term "component" is intended to be broadly construed as hardware, firmware, or a combination of hardware and software. As used herein, a processor is implemented in hardware, firmware, or a combination of hardware and software.

Some aspects are described herein in connection with thresholds. As used herein, satisfying a threshold may refer to a value being greater than the threshold, greater than or equal to the threshold, less than the threshold, less than or equal to the threshold, equal to the threshold, not equal to the threshold, and/or the like.

It will be apparent that systems and/or methods described herein may be implemented in different forms of hardware, firmware, or a combination of hardware and software. The actual specialized control hardware or software code used to implement these systems and/or methods is not limiting of the aspects. Thus, the operation and behavior of the systems and/or methods were described herein without reference to specific software code—it being understood that software and hardware can be designed to implement the systems and/or methods based, at least in part, on the description herein.

Even though particular combinations of features are recited in the claims and/or disclosed in the specification, these combinations are not intended to limit the disclosure of various aspects. In fact, many of these features may be combined in ways not specifically recited in the claims and/or disclosed in the specification. Although each dependent claim listed below may directly depend on only one claim, the disclosure of various aspects includes each dependent claim in combination with every other claim in the claim set. A phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

No element, act, or instruction used herein should be construed as critical or essential unless explicitly described as such. Also, as used herein, the articles "a" and "an" are intended to include one or more items, and may be used interchangeably with "one or more." Furthermore, as used herein, the terms "set" and "group" are intended to include one or more items (e.g., related items, unrelated items, a combination of related and unrelated items, and/or the like), and may be used interchangeably with "one or more." Where only one item is intended, the phrase "only one" or similar language is used. Also, as used herein, the terms "has," "have," "having," and/or the like are intended to be open-ended terms. Further, the phrase "based on" is intended to mean "based, at least in part, on" unless explicitly stated otherwise.

What is claimed is:

1. A method of wireless communication performed by a user equipment (UE), comprising:
    determining a duration of time that the UE dwells on a beam;
    determining that a condition associated with a duration value is satisfied based at least in part on determining the duration of time that the UE dwells on the beam; and
    modifying a priority of the beam for a beam selection procedure based at least in part on determining that the condition associated with the duration value is satisfied.

2. The method of claim 1, wherein modifying the priority of the beam comprises at least one of:
    removing the beam as a candidate for beam selection in association with the beam selection procedure,
    adding or maintaining the beam as a candidate for beam selection in association with the beam selection procedure,
    decreasing a priority of the beam relative to one or more other beams that are candidates for beam selection in association with the beam selection procedure,
    increasing a priority of the beam relative to one or more other beams that are candidates for beam selection in association with the beam selection procedure,
    modifying one or more beam selection criteria for the beam in association with the beam selection procedure, or
    a combination thereof.

3. The method of claim 1, wherein determining that the condition associated with the duration value is satisfied comprises determining that the duration value satisfies a threshold.

4. The method of claim 1, wherein the duration of time that the UE dwells on the beam represents an amount of time between switching to the beam and switching away from the beam.

5. The method of claim 1, wherein the duration value represents an average duration of time that the UE dwells on the beam after switching to the beam.

6. The method of claim 1, further comprising:
    determining a set of beam parameters for a set of beams, wherein the set of beam parameters includes one or more beam parameters for one or more beams of the set of beams; and
    determining that a condition associated with the duration value and one or more stored beam parameters, of the set of beam parameters, is satisfied.

7. The method of claim 6, wherein the one or more beam parameters include at least one of:
    a beam energy parameter,
    a reference signal received power parameter,
    a cell selection criteria parameter,
    a reference signal received quality parameter,
    a received signal strength indicator parameter,
    a signal to interference plus noise ratio parameter, or
    a combination thereof.

8. The method of claim 1, further comprising:
    determining a beam parameter associated with a second beam;
    determining that a second condition associated with the beam parameter is satisfied; and
    deprioritizing selection of the beam, relative to the second beam, in connection with the beam selection procedure based at least in part on determining that the condition and the second condition are satisfied.

9. The method of claim 8, wherein deprioritizing selection of the beam relative to the second beam comprises at least one of:
    selecting the second beam instead of the beam in connection with the beam selection procedure, removing the beam as a candidate for beam selection and maintaining the second beam as a candidate for beam selection in association with the beam selection procedure, decreasing a priority of the second beam relative to the beam in a beam selection list associated with the beam selection procedure, modifying one or more beam selection criteria for the beam or the second beam in association with the beam selection procedure, or a combination thereof.

10. The method of claim 8, wherein the beam is a neighbor cell beam and the second beam is a serving cell beam.

11. The method of claim 1, wherein determining that the condition associated with the duration value is satisfied comprises determining that a rate at which the UE switches to or from the beam satisfies the condition.

12. The method of claim 1, wherein modifying the priority of the beam comprises at least one of:

modifying a search and measurement periodicity associated with the beam, modifying a hysteresis timer associated with the beam, or a combination thereof.

13. A user equipment (UE) for wireless communication, comprising:

a memory; and one or more processors operatively coupled to the memory, the memory and the one or more processors configured to:

determine a duration of time that the UE dwells on a beam;

determine that a condition associated with a duration value is satisfied based at least in part on determining the duration of time that the UE dwells on the beam; and modify a priority of the beam in connection with a beam selection procedure based at least in part on determining that the condition associated with the duration value is satisfied.

14. The UE of claim 13, wherein the one or more processors, when modifying the priority of the beam, are configured to at least one of:

remove the beam as a candidate for beam selection in association with the beam selection procedure, add or maintain the beam as a candidate for beam selection in association with the beam selection procedure, decrease a priority of the beam relative to one or more other beams that are candidates for beam selection in association with the beam selection procedure, increase a priority of the beam relative to one or more other beams that are candidates for beam selection in association with the beam selection procedure, modify one or more beam selection criteria for the beam in association with the beam selection procedure, modify a search and measurement periodicity associated with the beam, modify a hysteresis timer associated with the beam, or a combination thereof.

15. The UE of claim 13, wherein the one or more processors, when determining that the condition associated with the duration value is satisfied, are configured to determine that the duration value satisfies a threshold.

16. The UE of claim 13, wherein the duration of time that the UE dwells on the beam represents an amount of time between switching to the beam and switching away from the beam.

17. The UE of claim 13, wherein the one or more processors are further configured to:

determine a set of beam parameters for a set of beams, wherein the set of beam parameters includes one or more beam parameters for each beam of the set of beams, and wherein the one or more processors, when determining that the condition is satisfied, the one or more processors are configured to determine that a condition associated with the duration value and one or more stored beam parameters, of the set of beam parameters, is satisfied.

18. The UE of claim 13, wherein the one or more processors, when determining that the condition associated with the duration value is satisfied, are configured to determine that a rate at which the UE switches to or from the beam satisfies a condition.

19. An apparatus comprising:

means for determining a duration of time that the apparatus dwells on a beam;

means for determining that a condition associated with a duration value is satisfied based at least in part on determining the duration of time that the apparatus dwells on the beam; and means for modifying a priority of the beam for a beam selection procedure based at least in part on determining that the condition associated with the duration value is satisfied.

20. The apparatus of claim 19, wherein the duration of time that the apparatus dwells on the beam represents an amount of time between switching to the beam and switching away from the beam.

* * * * *